(12) United States Patent
Nakahori

(10) Patent No.: US 8,004,867 B2
(45) Date of Patent: Aug. 23, 2011

(54) SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 15 days.

(21) Appl. No.: 12/662,003

(22) Filed: Mar. 26, 2010

(65) Prior Publication Data
US 2010/0246214 A1    Sep. 30, 2010

(30) Foreign Application Priority Data

Mar. 31, 2009 (JP) ................................. 2009-085955

(51) Int. Cl.
*H02H 7/122* (2006.01)
*H02M 3/335* (2006.01)

(52) U.S. Cl. ...................................... 363/56.05; 363/17
(58) Field of Classification Search ............... 363/17, 363/56.05, 132
See application file for complete search history.

(56) References Cited

U.S. PATENT DOCUMENTS

| | | | |
|---|---|---|---|
| 4,691,270 A * | 9/1987 | Pruitt | 363/56.05 |
| 4,864,479 A | 9/1989 | Steigerwald et al. | |
| 5,126,714 A | 6/1992 | Johnson | |
| 6,873,237 B2 | 3/2005 | Chandrasekaran et al. | |
| 7,046,523 B2 | 5/2006 | Sun et al. | |
| 7,295,094 B2 | 11/2007 | Jitaru et al. | |
| 7,405,955 B2 * | 7/2008 | Nakahori | 363/52 |
| 7,417,875 B2 | 8/2008 | Chandrasekaran et al. | |
| 2008/0239759 A1 | 10/2008 | Nakahori | |
| 2008/0247195 A1 | 10/2008 | Nakahori | |
| 2009/0079402 A1 | 3/2009 | Nakahori | |
| 2009/0109709 A1 | 4/2009 | Nakahori | |
| 2009/0109710 A1 | 4/2009 | Nakahori | |
| 2009/0168461 A1 | 7/2009 | Nakahori | |

FOREIGN PATENT DOCUMENTS

| | | |
|---|---|---|
| JP | A-2005-038872 | 2/2005 |
| JP | A-2007-088131 | 4/2007 |
| JP | A-2008-187801 | 8/2008 |
| JP | A-2008-199720 | 8/2008 |
| JP | A-2008-199721 | 8/2008 |
| JP | A-2008-253113 | 10/2008 |
| JP | A-2008-259387 | 10/2008 |
| JP | A-2009-100645 | 5/2009 |
| JP | A-2009-135320 | 6/2009 |
| JP | A-2009-136137 | 6/2009 |
| JP | A-2009-178018 | 8/2009 |
| JP | A-2009-178020 | 8/2009 |

* cited by examiner

*Primary Examiner* — Shawn Riley
(74) *Attorney, Agent, or Firm* — Oliff & Berridge, PLC

(57) ABSTRACT

A witching power supply unit, which suppresses switching loss in switching elements and surge voltage onto an output rectifier device and reduces the number of components, is provided. The switching power supply unit include: a switching circuit of full bridge type disposed on the input side; a rectifier circuit disposed on the output side; a transformer disposed between the switching circuit and the rectifier circuit and including a first winding on the input side, a second winding on the output side, a third winding; a surge voltage suppressing circuit connected in parallel with the switching circuit; and a driving circuit. The third winding is connected to the full bridge circuit to form a H-bridge configuration. Magnetic coupling between the first and second windings and magnetic coupling between the first and third windings are both looser than that between the second and third windings.

7 Claims, 26 Drawing Sheets

|          | 31A, 31B | 33A, 33B | 32A    | 32B    | 32C    | 32D    |
|----------|----------|----------|--------|--------|--------|--------|
| 31A, 31B |          | 0.99     | 0.99   | 0.99   | 0.99   | 0.99   |
| 33A, 33B | 0.99     |          | 0.9999 | 0.9999 | 0.9999 | 0.9999 |
| 32A      | 0.99     | 0.9999   |        | 0.9999 | 0.9999 | 0.9999 |
| 32B      | 0.99     | 0.9999   | 0.9999 |        | 0.9999 | 0.9999 |
| 32C      | 0.99     | 0.9999   | 0.9999 | 0.9999 |        | 0.9999 |
| 32D      | 0.99     | 0.9999   | 0.9999 | 0.9999 | 0.9999 |        |

FIG. 21

SWITCHING POWER SUPPLY UNIT

BACKGROUND OF THE INVENTION

1. Field of the Invention

The present invention relates to a switching power supply unit in which a switched output obtained by switching a DC input voltage is taken out in an output winding of a power converting transformer.

2. Description of the Related Art

Hitherto, various types of DC-DC converters have been proposed as a switching power supply unit and provided for practical use. Many of them are of a type in which a DC input voltage is switched with a switching operation by a switching circuit (inverter circuit) that is connected to a primary winding of a power converting transformer (transformer device), and the switched output (inverter output) is taken out in a secondary winding of the power converting transformer (transformer). The voltage appearing in the secondary winding in accordance with the switching operation of the switching circuit is rectified by a rectifier circuit, then is converted into a direct current by a smoothing circuit and outputted.

In a switching power supply unit of this kind, an output rectifier device such as an output rectifier diode is connected in series with a power transmission line in the rectifier circuit. Therefore, it is extremely effective for improving operative efficiency of the switching power supply unit to reduce loss in the output rectifier diode.

Reduction of loss in the output rectifier diode is effectively realized by using a diode having a small forward voltage drop. However, since the diode having a small forward voltage drop has also a low reverse withstand voltage, in order to use a diode having a small forward voltage drop as the output rectifier diode, it is particularly necessary to suppress the reverse voltage.

In a switching power supply unit of this kind, what to be most considered as such reverse voltage is a surge (spike) voltage caused by a parasitic element at the time of on/off operation of the switching circuit. It is to be noted that the surge voltage is applied as a reverse voltage to the output rectifier diode. Accordingly, various ideas have been executed in the past to suppress such surge voltage (refer to U.S. Pat. No. 4,864,479 and Japanese Patent Application Publication No. 2008-187801, for example).

SUMMARY OF THE INVENTION

In the above-mentioned U.S. Pat. No. 4,864,479, zero volt switching (ZVS) operation is implemented by LC resonance operation operated by using electrostatic capacity between the drain and the source of a switching element and leakage inductance of a transformer. In this manner, occurrence of switching loss in the switching element may be more suppressed.

However, when utilizing the leakage inductance of a transformer as an inductance component for resonance, it is difficult to separate the leakage inductance portion from the ideal transformer portion formed of a coupling between a primary winding and a secondary winding. Thereby, the resonance operation is implemented by the capacity component across both ends of a terminal of the ideal transformer portion together with the leakage inductance portion. Thus a surge voltage is likely to be generated and applied to an output rectifier diode.

Meanwhile, in the above-mentioned Japanese Patent Application Publication No 2008-187801, in order to implement the above-mentioned ZVS operation, high-coupling transformer is employed and a resonance inductor is provided separately from the transformer as an inductance component for LC resonance. Here, when resonance operation is implemented by the capacity component across both ends of a terminal of the transformer and the resonance inductor, the connection point of the transformer and resonance inductor is likely to resonate with twice as large amplitude as that of a voltage source. Accordingly, a surge voltage suppressing circuit formed by connecting diodes may be provided so that, when a voltage of the connection point between the transformer and the resonance inductor is on the point of exceeding a voltage of the voltage source, the voltage may be clamped to that of the voltage source. As a result, occurrence of surge voltage in the output rectifier diode is likely to be suppressed.

However, this method has an issue of increasing number of components in the unit because it needs to prepare a resonance inductor separately from a transformer.

As mentioned above, in the method of related art, it is difficult to suppress both of switching loss in the switching element and occurrence of surge voltage that will be applied to an output rectifier device while reducing the number of components in the unit. Accordingly, there is a room for improvement.

It is desirable to provide a switching power supply unit in which suppression of switching loss in switching elements and surge voltage applied to an output rectifier element is available while reducing the number of components in the unit.

A switching power supply unit according to an embodiment of the present invention, which generates a DC output voltage through performing voltage conversion on a DC input voltage inputted from an input terminal pair and outputs the generated DC output voltage from an output terminal pair, comprises a switching circuit of full bridge type disposed on a side near the input terminal pair and including four switching elements which configure two arms of the full bridge switching circuit, a rectifier circuit disposed on a side near the output terminal pair and including a plurality of first rectifier devices, a transformer disposed between the switching circuit and the rectifier circuit and including a first winding on a side near the input terminal pair, a second winding on a side near the output terminal pair, and a third winding, a surge voltage suppressing circuit connected in parallel with the switching circuit and including a full bridge circuit configured of four second rectifier devices which configure two arms of the surge voltage suppressing circuit, each of the four second rectifier devices being disposed so as to be applied with a voltage of reverse direction, and a driving circuit driving the switching circuit. The third winding is connected to the full bridge circuit to form a H-bridge configuration, and magnetic coupling between the first and second windings and magnetic coupling between the first and third windings are both looser than magnetic coupling between the second and third windings.

In the switching power supply unit according to an embodiment of the present invention, an input voltage inputted from input terminal pairs is switched in a switching circuit and an AC voltage is generated therefrom. Then, the AC voltage is transformed by the transformer and then rectified by the rectifier circuit. Thus an output voltage is outputted from output terminal pairs. Here, since magnetic coupling between the first and second windings and magnetic coupling between the first and third windings are looser than that of the second and third windings, leakage inductance component is generated in the transformer. Thus, this leakage inductance component and capacity component across both ends of the above-mentioned switching elements (parasitic capacitance or other capacitive element of the switching elements) together forms an LC resonance circuit. Thus, ZVS operation is implemented by resonance operation of the LC resonance circuit without preparing the inductor separately from the transformer. At this time, because resonance operation is performed by leakage inductance component and the capacity component across both ends of the terminals in the ideal transformer portion (the first and second windings) in the transformer, a surge voltage (reverse voltage) is applied to the first rectifier device. Here, since there is obtained a function of clamping to a voltage across both ends of the third winding, which is brought about by the second rectifier in the surge voltage suppressing circuit, the surge voltage applied to the first rectifier device is suppressed.

The switching power supply unit according to an embodiment of the present invention may further include third rectifier devices connected in parallel with the four switching elements, respectively. Here, two of the third rectifier devices, connected in parallel with two of the four switching elements, respectively, also serve as two of the four second rectifier devices. The two of the four switching elements forming one of the two arms in the switching circuit, and the two of the four second rectifier devices forming one of the two arms in the full bridge circuit. With such configuration, the number of rectifier devices decreases in total, and reduction in the number of components is available.

The switching power supply unit according to an embodiment of the present invention may further include capacitive elements each of which is connected in parallel with the four switching elements. Here, the third winding and the capacitive elements may together form an LC resonance circuit. With such configuration, occurrence of switching loss in the switching elements is suppressed by the resonance operation by the above-mentioned LC resonance circuit.

Here, in the above-mentioned cases, the switching elements may be constituted from a field effect transistor and at least one of the capacitive elements and the third rectifier devices may be constituted from either one of the parasitic capacitance or parasitic diode of the field effect transistor. With such configuration, the number of devices to be used is reduced and the circuit configuration is simplified.

The switching power supply unit according an embodiment of the present invention, the transformer includes a magnetic core including two base-plates facing each other and four legs provided between the two base-plates to couple the two base-plates together, the four legs being arranged along a pair of diagonal lines intersecting each other in a plane along facing surfaces of the two base-plates, a first conductive member having through-holes through which the four legs pass, respectively, and being wound around part of the four legs, to serve as the first winding, second conductive members each having a through-hole through which one of the four legs passes, and being wound around the one of the four legs, to serve as the second winding, and a third conductive member having through-holes through which the four legs pass, respectively, and being wound around part of the four legs, to serve as the third winding. Here, the first to third windings are wound around so that closed magnetic paths are formed inside the magnetic core from the four legs to the two base-plates due to currents which flow through the first, second or third winding, and so that a couple of magnetic fluxes each generated inside each of a couple of legs arranged along one of the two diagonal lines are both directed in a first direction, while so that another couple of magnetic fluxes each generated inside each of another couple of legs arranged along another diagonal line are both directed in a second direction which is opposite to the first direction. In this configuration, four flux paths, each flowing in one direction through adjacent two of the four leg portions and through the two base portions, are formed inside the four leg portions and the two base portions. Accordingly, reduction of flux density in magnetic core is available due to the dispersion of flux path compared with the case where a U-shaped core is employed, thereby reducing the core loss. Further, since radiation path is expanded compared with the case of an E-shaped core, cooling of the first and second windings gets more easy as with the cooling of the magnetic core itself. As a result, cost reduction is available while increasing reliability of product.

In the switching power supply unit according to an embodiment of the present invention, the transformer may include a magnetic core including two base-plates facing each other and four legs provided between the two base-plates to couple the two base-plates together, the four legs being arranged along a pair of diagonal lines intersecting each other in a plane along facing surfaces of the two base-plates, a first conductive member having through-holes through which the four legs pass, respectively, and being wound around part of the four legs, to serve as the first winding, second conductive members each having a through-hole through which one of the four legs passes, and being wound around the one of the four legs, to serve as the second winding, and a third conductive member having through-holes through which the four legs pass, respectively, and being wound around part of the four legs, to serve as the third winding. Here, the first to third windings are wound around so that four closed magnetic paths are formed inside the magnetic core from the four legs to the two base-plates due to currents which flow through the first, second or third winding, the four closed magnetic paths each passing through both adjacent two of the four legs and the two base-plates and then returning. In this configuration, reduction of flux density in magnetic core is available due to the dispersion of flux path compared with the case when a U-shaped core is employed, thereby reducing the core loss. Further, since radiation path is expanded compared with the case of an E-shaped core, cooling of the first and second windings gets more easy as with the cooling of the magnetic core itself. As a result, cost reduction is available while increasing reliability of product.

In the switching power supply unit according to an embodiment of the present invention, magnetic coupling between the first and second windings and magnetic coupling between the first and third windings are looser than that of the second and third windings so as to generate the leakage inductance component, and thus the LC resonance circuit is formed together by the leakage inductance component and capacity component across both ends of switching elements. As a result, ZVS operation may be implemented without providing an inductor separately from the transformer. In addition, since the surge voltage suppressing circuit is provided, there is obtained a function of clamping to a voltage across both ends of the third winding, which is brought about by the second rectifier device, and thus a surge voltage that will be applied to the first rectifier device due to resonance operation by the capacity component across both ends of terminals in the ideal transformer portion and leakage inductance component may be suppressed. Accordingly, occurrence of switching loss in the switching elements and occurrence of surge voltage that will be applied to the output rectifier device may be suppressed while reducing the number of components in the unit.

Other and further objects, features and advantages of the invention will appear more fully from the following description.

BRIEF DESCRIPTION OF THE DRAWINGS

FIG. 21 is a table indicating an example of coupling coefficient between windings in the transformer of FIG. 19.

DESCRIPTION OF THE PREFERRED EMBODIMENTS

Embodiment of the invention will be described in detail hereinbelow with reference to the drawings.

Embodiment of the Invention (Whole Configuration Example of a Switching Power Supply Unit)

Figure 1:
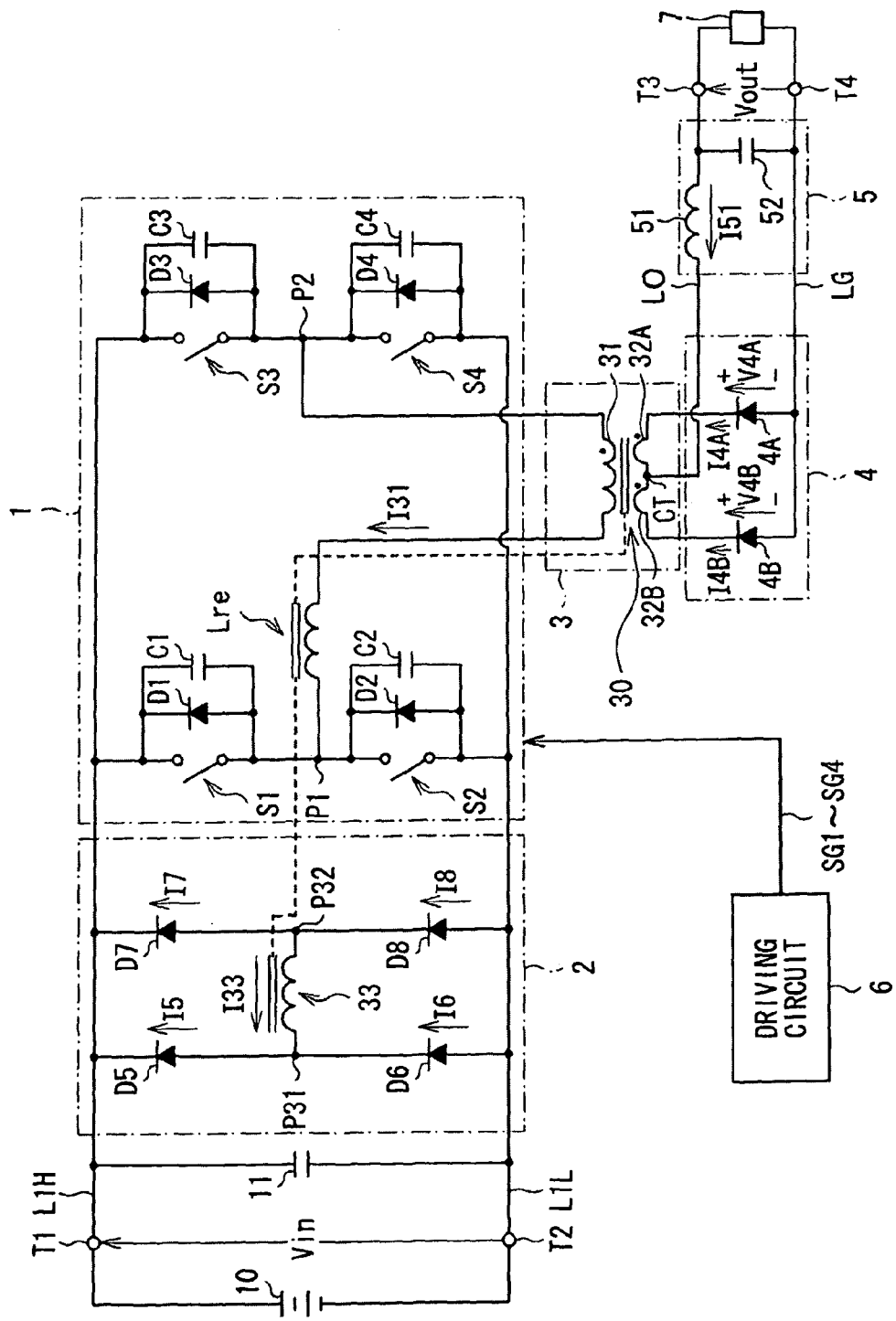
FIG. 1 is a circuit diagram showing a configuration of a switching power supply unit according to an embodiment of the present invention.
Figure 2:
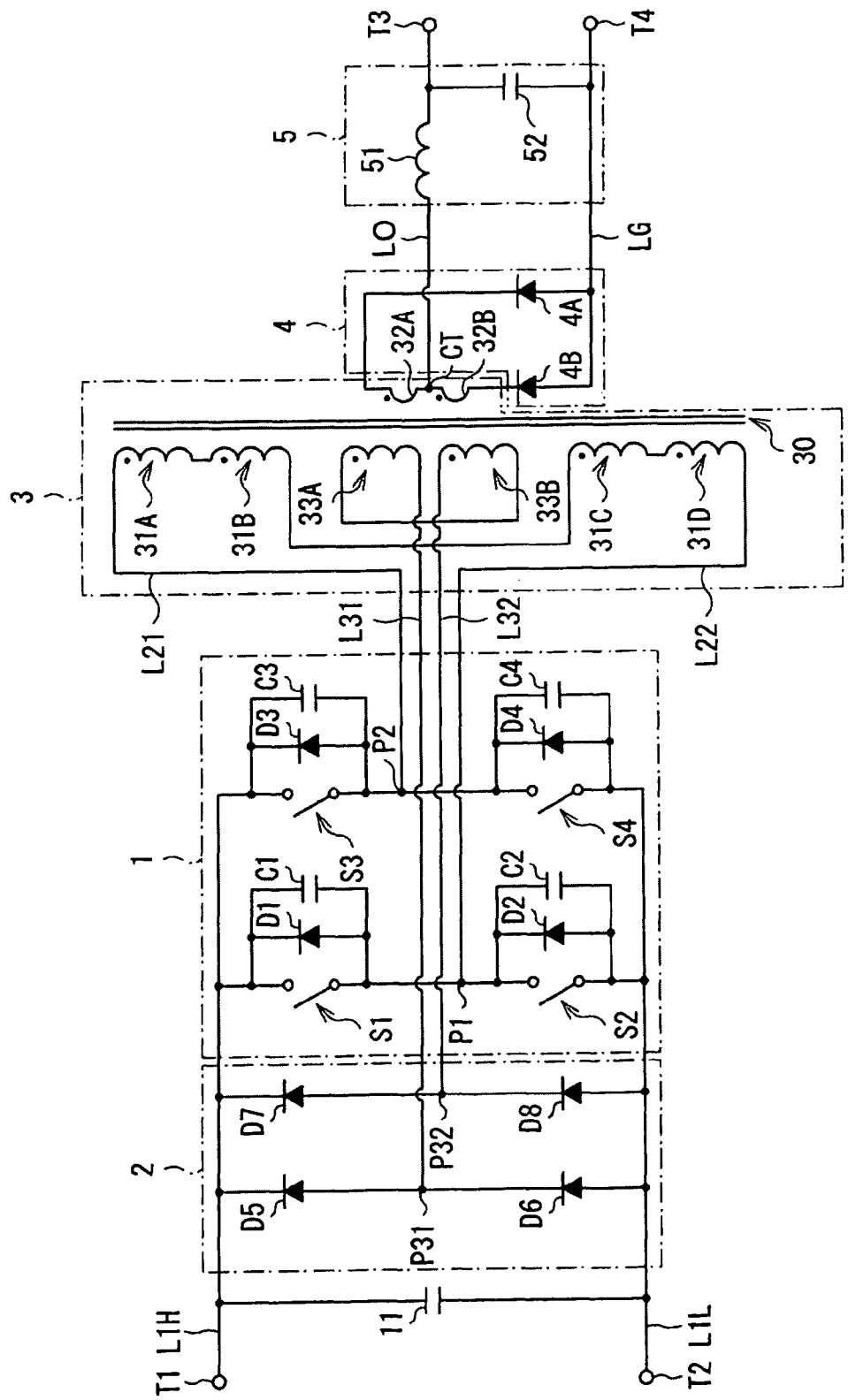
FIG. 2 is a circuit diagram illustrating an equivalent circuit of the switching power supply unit of FIG. 1.

FIG. 1 is a circuit diagram of a switching power supply unit according to an embodiment of the present invention, and FIG. 2 is an equivalent circuit diagram of the switching power supply unit of FIG. 1, where a driving circuit 6 to be described later is excluded. The switching power supply unit functions as a DC-DC converter, in which higher DC input voltage Vin supplied from a high voltage battery 10 is converted into a lower DC output voltage Vout and supplied to a low voltage battery which is not illustrated, so as to drive a load 7.

The switching power supply unit has an input smoothing capacitor 11 provided between a primary side high voltage line L1H and a primary side low voltage line L1L, a bridge circuit 1, a surge voltage suppressing circuit 2, and a transformer 3 including a magnetic core 30, a first winding (primary winding) 31 (31A to 31D), a second winding (secondary winding) 32A and 32B, and a third winding wire 33 (33A and 33B). The higher DC input voltage Vin outputted from the high voltage battery 10 is applied across an input terminal T1 of the primary side high voltage line L1H and an input terminal T2 of the primary side low voltage line L1L. The switching power supply unit also includes a rectifier circuit 4 provided on the secondary side of the transformer 3 and a smoothing circuit 5 connected to the rectifier circuit 4, and a driving circuit 6 for driving the bridge circuit 1.

The input smoothing capacitor 11 smoothes the DC input voltage Vin applied from the input terminals T1 and T2.

The bridge circuit 1 has four switching element S1 to S4, and capacitors C1 to C4 and diodes D1 to D4 connected in parallel with the switching element S1 to S4 respectively, and is configured as a full-bridge circuit. More specifically, one end of the switching element S1 and one end of the switching element S2 are connected to each other at a connection point P1, and one end of the switching element S3 and one end of the switching element S4 are connected to each other at a connection point P2. These ends (connection points P1 and P2) are then connected to each other via a resonance inductor Lre to be described later and the primary winding 31 of the transformer 3. The other ends of the switching element S1 and S3 are connected to each other and connected to the input terminal T1, and the other ends of the switching element S2 and S4 are connected to each other and connected to the input terminal T2. In this configuration, the bridge circuit 1 converts the DC input voltage Vin applied across the input terminals T1 and T2 into an AC voltage in accordance with drive signals SG1 to SG4 supplied from the driving circuit 6, and outputs it therefrom.

Examples of the switching element S1 to S4 to be used are MOS-FETs (Metal Oxide Semiconductor-Field Effect Transistor), IGBT (Insulated Gate Bipolar Transistor), or the like. When MOS-FETs are employed as the switching element, the above-mentioned capacitors C1 to C4 and the diodes D1 to D4 may be constituted from parasitic capacitance or parasitic diodes of the MOS-FETs. Alternatively, the above-mentioned capacitors C1 to C4 may be constituted from junction capacitance of the diodes D1 to D4. With such configuration, there is no need of separately providing the capacitors C1 to C4 and the diodes D1 to D4 in addition to the switching elements, thereby simplifying the circuit configuration.

The bridge circuit 1 has a resonance inductor Lre constituted from a leakage inductance of the transformer 3. Namely, as shown in FIG. 1, the inductor Lre is magnetically coupled with the primary winding 31, the secondary winding 32, and a third winding of the transformers respectively. What is more, inductance of the inductor Lre is very small compared with that of the primary winding 31, the secondary windings 32A and 32B and the third winding 33. Here in FIG. 2 and FIG. 3 to be described later, illustration of the inductor Lre is omitted for convenience of explanation. One end of the inductor Lre is connected to the connection point P1 and the other end thereof is connected to the connection point P2 via the primary winding 31 of the transformer 3. Namely, the inductor Lre is connected in H-bridge configuration to the bridge circuit constituted from the switching element S1 and S2 and the switching element S3 and S4. In such configuration, the inductor Lre forms an LC series resonance circuit together with the capacitors C1 to C4 in the bridge circuit 1 so that the occurrence of switching loss in the switching element S1 to S4 may be suppressed by utilizing the resonance characteristics of the LC series resonance circuit, as described later.

The surge voltage suppressing circuit 2 includes two pairs of reversely-connected diodes D5 and D6 and diodes D7 and D8 and the foregoing third winding 33. The cathodes of the diodes D5 and D7 are connected to the primary side high voltage line L1H, and the anodes of the diodes D6 and D8 are connected to the primary side low voltage line L1L. The anode of the diode D5 and the cathode of the diode D6 are connected to each other at the connection point P31, and the anode of the diode D7 and the cathode of the diode D8 are connected to each other at the connection point P32. The third winding 33 is connected between these connection points P31 and P32. More specifically, one end of the third winding 33A is connected to the connection point P31 via a connection line L31 and the other end of the third winding 33A is connected to one end of the third winding 33B, and the other end of the third winding 33B is connected to the connection point P32 via a connection line L32. Namely, the third winding 33 is connected in H-bridge configuration to a full, bridge circuit constituted from the diodes D5 to D8. With such configuration, the surge voltage suppressing circuit 2 functions to suppress a surge voltage that will be applied to rectifier diodes 4A and 4B in an after-mentioned rectifier circuit 4 owing to a function of clamping to a voltage across both ends of the third winding 33, which is brought about by the two pairs of reversely connected diodes D5 and D6 and diodes D7 and D8.

The transformer 3 includes a magnetic core 30 configured of an upper core UC and a lower core DC that are facing each other as described later, the four primary windings 31A to 31D and the two secondary windings 32A and 32B, and the two third windings 33A and 33B. Here, magnetic coupling between the primary windings 31A to 31D and the secondary windings 32A and 32B, and magnetic coupling between the primary windings 31A to 31D and the third windings 33A and 33B are loose compared with that between the secondary windings 32A and 32B and the third windings 33A and 33B. Namely, the magnetic coupling between the primary windings 31A to 31D and the secondary windings 32A and 32B, and the magnetic coupling between the primary windings 31A to 31D and the third windings 33A and 33B are loose while the magnetic coupling between the secondary windings 32A and 32B and the third windings 33A and 33B is tight. In addition, each primary windings 31A to 31D is mutually connected in series. Specifically, one end of the primary winding 31A is connected to the connection point P2 via a connection line L21, and the other end is connected to one end of the primary winding 31B. The other end of the primary winding 31B is connected to one end of the primary winding 31C, the other end of the primary winding 31C is connected to one end of the primary winding 31D, and the other end of the primary winding 31D is connected to the connection point P1. Here, there is a presence of the foregoing inductor Lre as a leakage inductance of the primary windings 31A to 31D and the secondary windings 32A and 32B. In the secondary side of the transformer 3, the secondary windings 32A and 32B are mutually connected in series. Specifically, one end of the secondary winding 32A is connected to the cathode of an after-mentioned rectifier diode 4A while one end of the secondary winding 32B is connected to the cathode of an after-mentioned rectifier diode 4B. The other ends of the secondary windings 32A and 32B are mutually connected at a center tap CT, from which a wiring is led toward an output line LO. Moreover, one end of the third winding 33A is connected via the connection line L31 to the connection point P31, and the other end is connected to one end of the third winding 33B. The other end of the third winding 33B is connected via the connection line L32 to the connection point P32. This transformer 3 stepdowns the AC voltage (AC voltage inputted into the transformer 3) generated by the bridge circuit 1, and outputs from each end portion of the secondary windings 32A and 32B an AC voltage of a phase shifted by 180 degrees. In this configuration, the level of the voltage drop is determined based on the turns ratio between the primary windings 31A to 31D and the secondary windings 32A and 32B. Configuration of the transformer 3 will be hereinafter described in detail.

The rectifier circuit 4 is a single-phase full-wave rectifier constituted from a pair of rectifier diodes 4A and 4B. The cathode of the rectifier diode 4A is connected to one end of the secondary winding 32A, and the cathode of the rectifier diode 4B is connected to one end of the secondary winding 32B. The anodes of these rectifier diodes 4A and 4B are connected to each other at the center tap CT and led to the ground line LG. That is, the rectifier circuit 4 has a configuration of anode-common connection of a center-tap type, in which the rectifier diodes 4A and 4B rectify the respective half wave periods of the outputted AC voltages supplied from the transformer 3.

The smoothing circuit 5 is configured to include a choke coil 51 and an output smoothing capacitor 52. The choke coil 51 is inserted in the course of the output line LO such that one end thereof is connected to the center tap CT while the other end is connected to an output terminal T3 of the output line LO. The output smoothing capacitor 52 is connected between the output line LO and the ground line LG. An output terminal T4 is provided at the end of the ground line LG. In this configuration, the smoothing circuit 5 smoothes the voltage rectified in the rectifier circuit 4 to generate a DC output voltage Vout and outputs it through the output terminals T3 and T4 to a low voltage battery (not shown) for power supply.

The driving circuit 6 is provided to drive the switching element S1 to S4 in the bridge circuit 1. Specifically, the driving circuit 6 supplies drive signals SG1 to SG4 to the switching element S1 to S4 respectively to take a control of on/off operation of the switching element S1 to S4. The driving circuit 6 also does a phase control on the switching element S1 to S4 as will be described later to properly set the switching phase difference, thereby stabilizing the DC output voltage Vout.

(Detailed Configuration of the Transformer 3)

Figure 3:
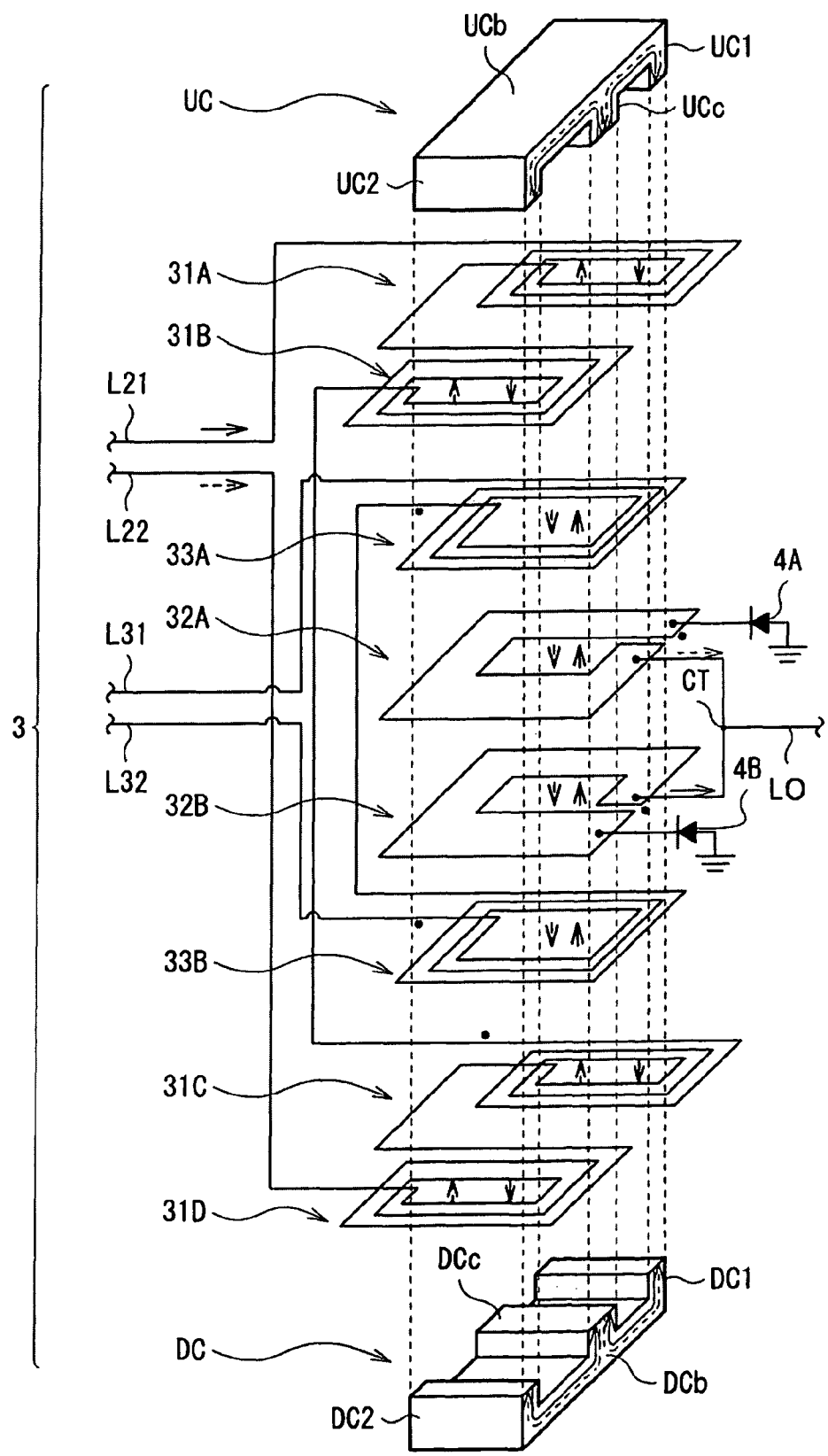
FIG. 3 is an exploded perspective view showing an external appearance configuration of a principal part of a transformer illustrated in FIG. 2.

Subsequently, configuration of the transformer 3 will be described in detail according to the present embodiment with reference to FIG. 3. FIG. 3 is an exploded perspective view showing an external appearance configuration of the principal part of the transformer 3.

The transformer 3 is configured such that the primary windings 31A to 31D, the secondary windings 32A and 32B, and the third windings 33A and 33B are wound around with respect to a core material (magnetic core 30) constituted from a pair of upper core UC and a lower core DC that are facing each other, in a plane perpendicular to the extending direction (vertical direction) of three leg portions to be described later (namely, in a horizontal plane). It is to be noted that the primary windings 31A to 31D and the third windings 33A and 33B may be formed of a printed coil, for example, and the secondary windings 32A and 32B may be formed of a metal plate (plate like conductive member), for example.

The upper core UC is constituted from a base core UCb and three leg portions extended from the base core UCb in the above-mentioned vertical direction, that is, a first leg portion UC1, a second leg portion UC2 and a central leg portion (common leg portion) UCc. The lower core DC is constituted from a base core DCb and three leg portions extended from the base core DCb in the above-mentioned vertical direction, that is, a first leg portion DC1, a second leg portion DC2 and a central leg portion (common leg portion) DCc. The first leg portions UC1 and DC1 and the second leg portions UC2 and DC2 are arranged at both ends of the rectangular base core UCb and DCb, and the central leg portions UCc and DCc are arranged between the first leg portions UC1 and DC1 and the second leg portions UC2 and DC2 (namely, at the central portion) on the base cores UCb and DCb. Namely, the upper core UC and the lower core DC constitute an E-E type magnetic core 30. These leg portions UC1, UC2, UCc, DC1, DC2 and DCc have a function of magnetically connecting the mutually-facing two base cores UCb and DCb. The upper core UC and the lower core DC are each made of a magnetic material such as ferrite, for example. Moreover, the printed coil and metal plate that constitute the primary windings 31A to 31D, the secondary windings 32A and 32B and the third windings 33A and 33B to be described later are each made of a conductive material such as copper and aluminum, for example.

The primary windings 31A and 31C are wound around the first leg portions UC1, DC1 and the central leg portions UCc and DCc respectively, and the primary windings 31B and 31D are wound around the second leg portions UC2, DC2 and the central leg portions UCc and DCc respectively. The secondary windings 32A and 32B are disposed between the primary windings 31A and 31B and the primary windings 31C and 31D, and wound around the central leg portions UCc and DCc respectively. The third winding 33A is disposed between the secondary winding 32A and the primary windings 31A and 31B, and wound around the central leg portions UCc and DCc. The third winding 33B is disposed between the secondary winding 32B and the primary windings 31C and 31D, and wound around the central leg portions UCc and DCc. In this manner, as mentioned above, magnetic coupling between the primary windings 31A to 31D and the secondary windings 32A and 32B, and magnetic coupling between the primary windings 31A to 31D and the third windings 33A and 33B are loose, while magnetic coupling between the secondary windings 32A and 32B and the third windings 33A and 33B is tight.

Here, the primary windings 31A to 31D, the secondary windings 32A and 32B, and the third windings 33A and 33B are each configured to be pulled out from outside via wirings (connection lines L21 and L22, connection lines L31 and L32, the output line LO, and the ground line LG) in an in-plane direction of the printed coils or the metal plates.

In this configuration, in the transformer 3, due to currents passing through the primary windings 31A to 31D, the secondary windings 32A and 32B and the third windings 33A and 33B, a flux path (reflux of flux path) that constitutes a magnetic flux is formed in the inside of the three leg portions UC1/UC2, DC1/DC2, UCc/DCc and the two base cores UCb and DCb, as shown by arrows indicated in FIG. 3, for example. It is to be noted that the arrows indicated in FIG. 3 within the first windings 31A to 31D, the second windings 32A and 32B and the third windings 33A and 33B each represent a direction of magnetic flux, and the solid-line arrows correspond to a magnetic flux formed at the time that a current flows from the connection line L21 in a direction indicated in the solid line, while the broken-line arrows correspond to a magnetic flux formed at the time that a current flows from the connection line L22 in a direction indicated in the broken line.

Here, the input terminals T1 and T2 correspond to the a specific example of "input terminal pair" of the invention, and the output terminals T3 and T4 correspond to a specific example of "output terminal pair" of the invention. The primary winding 31 corresponds to a specific example of "primary windings" of the invention, and the secondary windings 32A and 32B correspond to a specific example of "secondary windings" of the invention. The bridge circuit 1 corresponds to a specific example of "switching circuit" of the invention. Moreover, the rectifier diodes 4A and 4B correspond to a specific example of the "first rectifier device" of the invention, the diodes D5 to D8 correspond to a specific example of the "second rectifier device" of the invention, and the diodes D1 to D4 correspond to a specific example of the "third rectifier device" of the invention. In addition, an arm formed of the switching element S1 and S2 and an arm formed of the switching element S3 and S4 correspond to a specific example of "two arms in switching circuit" of the invention. An arm formed of the diodes D5 and D6 and an arm formed of the diodes D7 and D8 correspond to a specific example of "two arms in the surge voltage suppressing circuit" of the invention.

Subsequently, functions and effects of the switching power supply unit according to the embodiment will be explained.

(1. Fundamental Operation of Switching Power Supply Unit)

First, fundamental operation of the switching power supply unit will be explained.

In the switching power supply unit, a DC input voltage Vin supplied from the input terminals T1 and T2 are switched and an AC voltage is generated in the bridge circuit 1, which is then supplied to the primary winding 31 (31A to 31D) of the transformer 3. In the transformer 3, the AC voltage is then transformed and the transformed AC voltage is then outputted from the secondary windings 32A and 32B.

In the rectifier circuit 4, the AC voltage outputted from the transformer 3 is rectified by the rectifier diodes 4A and 4B. Thereby, a rectified output is generated between the center tap CT (output line LO) and the connection point (ground line LG) of the rectifier diodes 4A and 4B.

In the smoothing circuit 5, the rectified output generated in the rectifier circuit 4 is smoothed by the choke coil 51 and the output smoothing capacitor 52, and is outputted as DC output voltage Vout from the output terminal T3 and T4. Then the DC output voltage Vout is supplied to a not-illustrated low voltage battery for power supply so that the load L is driven.

(2. Operation for Suppressing Surge Voltage)

Subsequently, operation for suppressing an occurrence of surge voltage applied to the rectifier diodes 4A and 4B in the rectifier circuit 4, which is the major characteristics according to an embodiment of the present invention will be explained in detail with reference to FIGS. 4 to 16.

Figure 4:
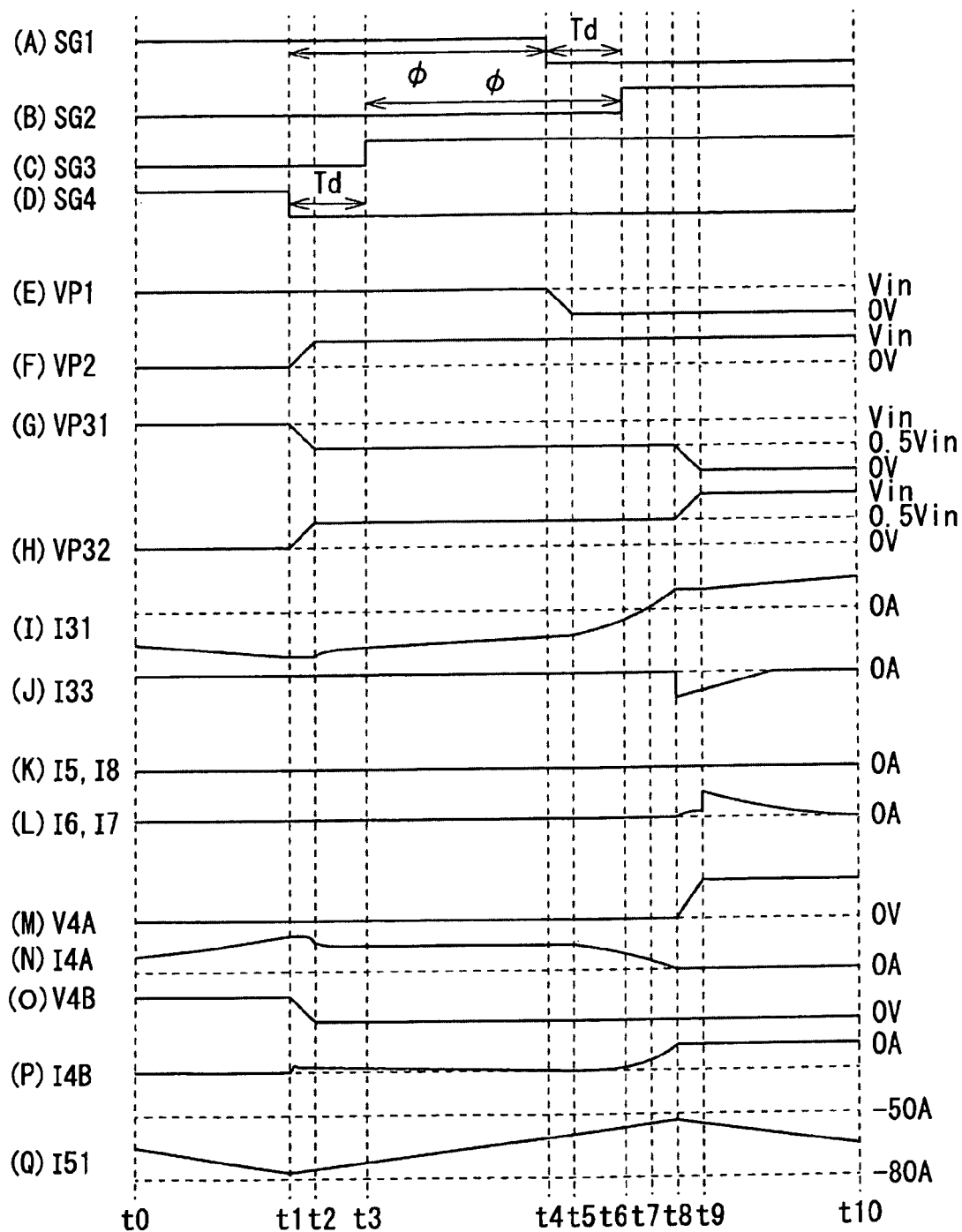
FIG. 4 is a timing waveform showing the operation of the switching power supply unit of FIG. 1.

FIG. 4 is a timing waveform in which voltage waveforms or current waveforms of each part of the switching power supply unit of FIG. 1 are shown according to each timing (timings from t0 to t10). Here, (A) to (D) represent voltage waveforms of the driving signals SG1 to SG4, and (E) to (H) represent potentials VP1, VP2, VP31 and VP32 of the connection points P1, P2, P31 and P32 respectively. (I) represents a current I31 passing through the first winding 31 of the transformer 3, and (J) represents a current I33 passing through the third winding 33 of the transformer 3, (K) represents currents I5 and I8 passing through the diodes D5 and D8 in the surge voltage suppressing circuit 2, and (L) represents currents I6 and I7 passing through the diodes D6 and D7 in the surge voltage suppressing circuit 2. (M) and (O) respectively represent reverse voltages V4A and V4B applied across the anode and the cathode of the rectifier diodes 4A and 4B, and (N) and (P) respectively represent currents I4A and I4B passing through the rectifier diodes 4A and 4B, and (Q) represents a current I51 passing through the choke coil 51. Direction of each voltage is indicated by arrows as shown in FIG. 1, where the direction from "−" to "+" is defined as forward direction. As for each current, the direction indicated by arrows in FIG. 1 is also defined as forward direction.

Figure 14:
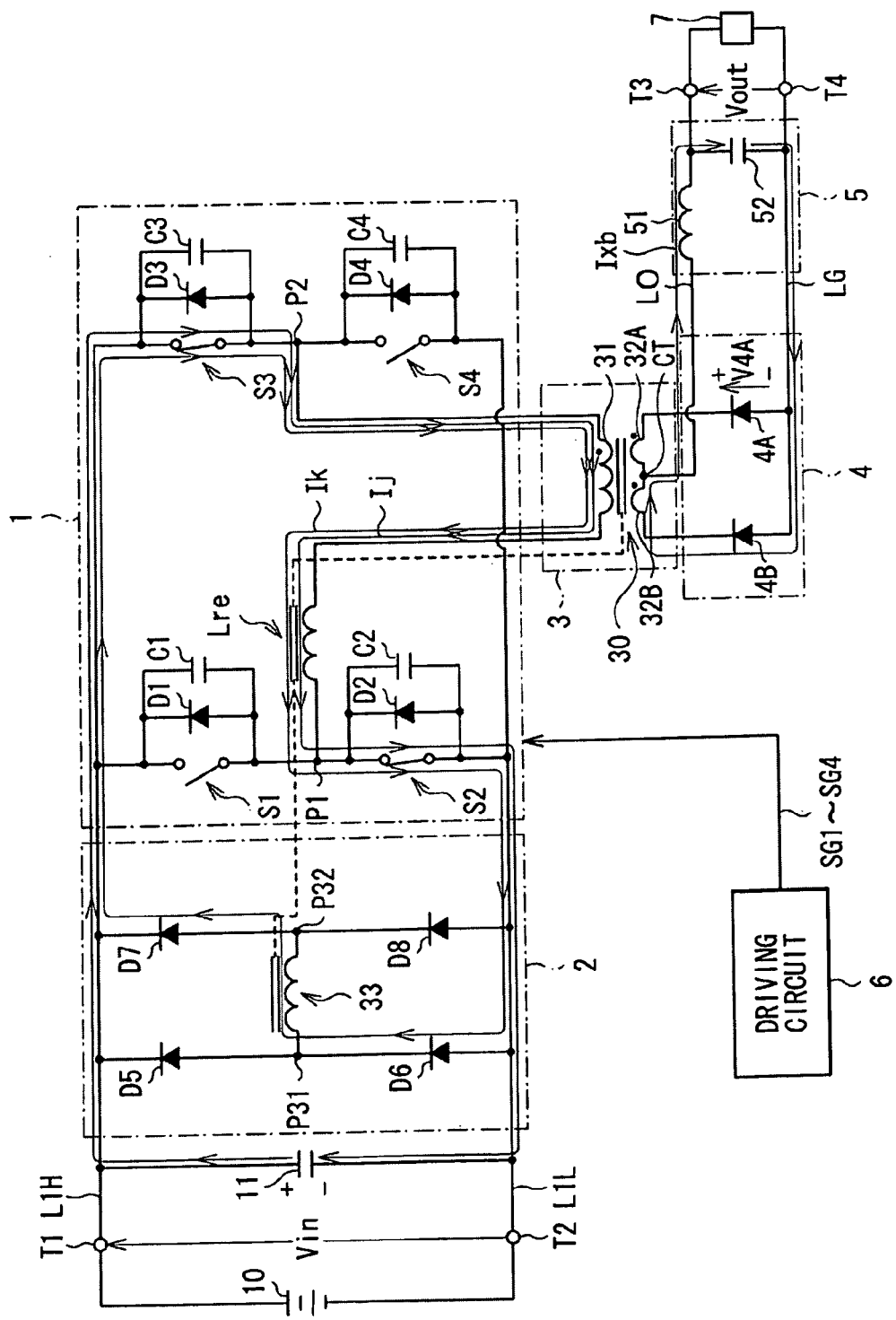
FIG. 14 is a circuit diagram for explaining the operation of the switching power supply unit subsequent to FIG. 13.
Figure 15:
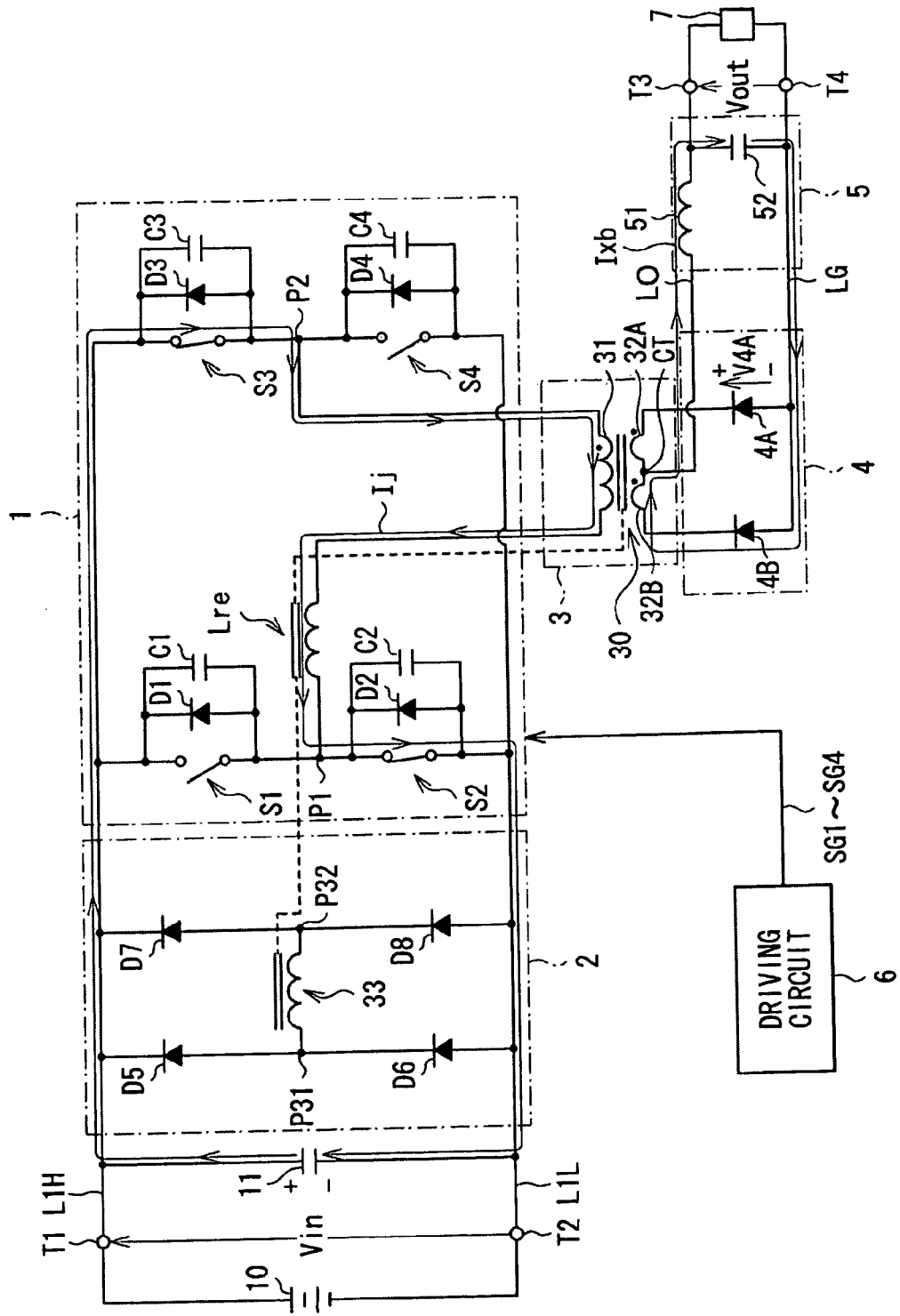
FIG. 15 is a circuit diagram for explaining the operation of the switching power supply unit subsequent to FIG. 14.
Figure 16:
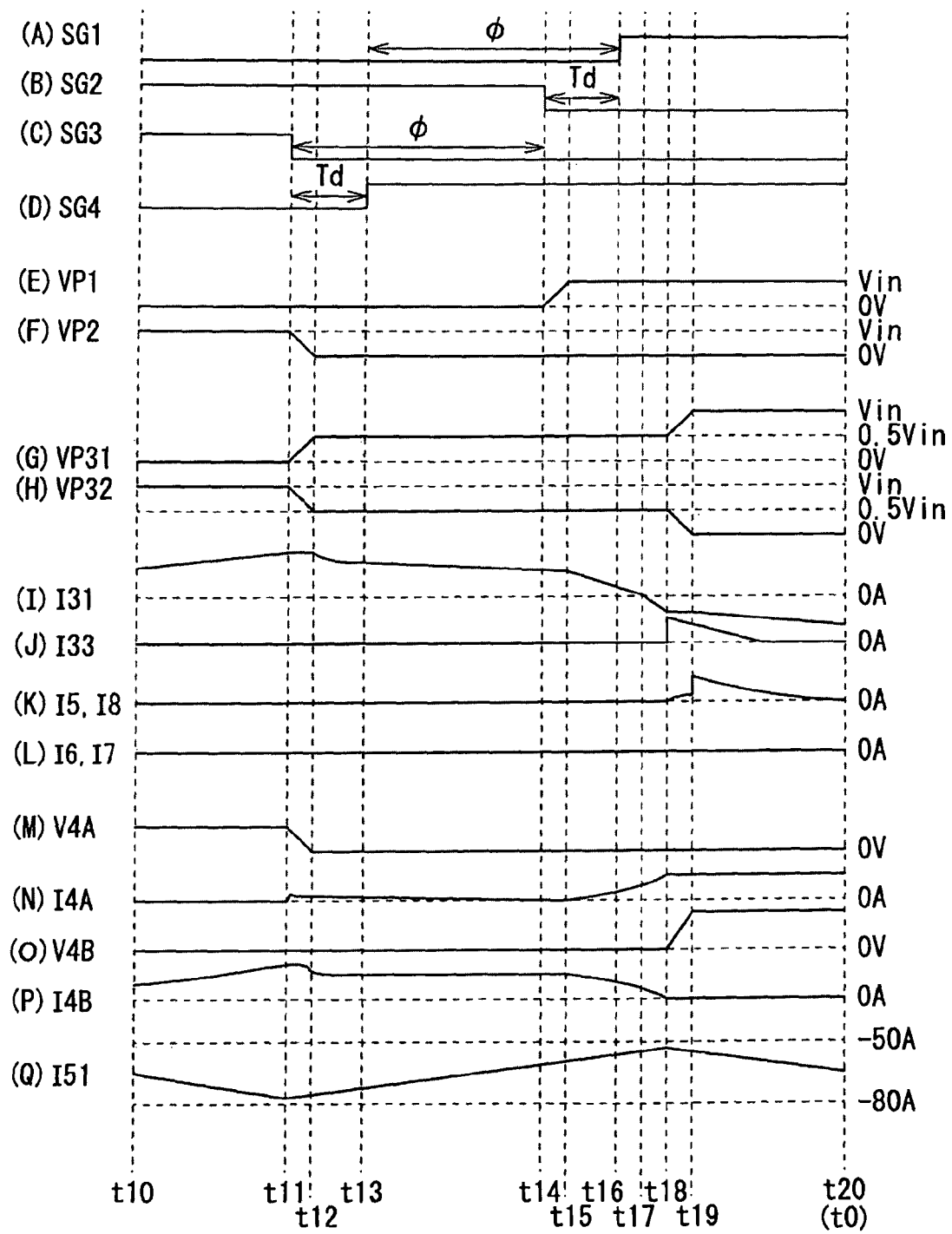
FIG. 16 is a timing waveform to explain the operation of the switching power supply unit subsequent to FIG. 15.

Moreover, FIGS. 5 to 15 show an operating state of the switching power supply unit on each timing (timings t0 to t10) indicated in FIG. 4, and FIG. 16 is a voltage waveform or a current waveform on each timing (timings from t10 to t20 or t0) subsequent to FIG. 4. It is to be noted that the timings shown in FIGS. 4 and 16 each correspond to a half cycle of the operation in the switching power supply unit. Thus these half-cycle operations are combined and add up to one-cycle operation.

(2-1. Operation for Suppressing Surge Voltag in the First Half Cycle)

First, the operation in the first half cycle will be explained with reference to FIGS. 4 to 15.

As for the driving signals SG1 to SG4 (see FIGS. 4A to 4D) of the switching element S1 to S4, it is known that these switching elements are classified into two types of switching element pairs. Specifically, the switching element S1 and S2 are controlled to turn on at fixed timings on the temporal axis and therefore called "phase-fixed switching element." Meanwhile, the switching element S3 and S4 are controlled to turn on at variable timings on the temporal axis and therefore called "phase-shift switching element."

The switching element S1 to S4 are driven at a timing and in combination so that the input terminals T1 and T2 across which the DC input voltage Vin is applied are never electrically short-circuited in any switching operation. Specifically, the switching element S3 and S4 (phase-shift switching element) are not turned on simultaneously, and the switching element S1 and S2 (phase-fixed switching element) are not turned on simultaneously. A time interval required to avoid simultaneous turns-on of the switching element is called dead time "Td" (see FIGS. 4A and 4D).

The switching elements S1 and S4 have a period in which they are turned on simultaneously, and in the period when the switching element S1 and S4 are simultaneously turned on, the primary winding 31 of the transformer 3 is excited. In addition, the switching elements S1 and S4 are operated so as to have a switching phase difference φ with reference of the switching element S1 (phase-fixed switching element) (see FIGS. 4A and 4D). Similarly, the switching element S2 and S3 have a period in which they are simultaneously turned on, and in the period in which they are simultaneously turned on, the primary winding 31 of the transformer 3 is excited in a direction opposite to the above. The switching elements S2 and S3 are operated so as to have a switching phase difference φ with the reference of the switching element S2 (phase-fixed switching element) (see FIGS. 4B and 4C). Further, when the switching phase difference φ between the switching elements S1 and S4 and the switching phase difference φ between the switching elements S2 and S3 are controlled, the period in which the switching element S1 and S4 are simultaneously turned on and the period in which the switching element S2 and S3 are simultaneously turned on are respectively varied. Accordingly, the duty ratio of the AC voltage applied to the primary winding 31 of the transformer 3 changes, and the DC output voltage Vout is stabilized.

Figure 5:
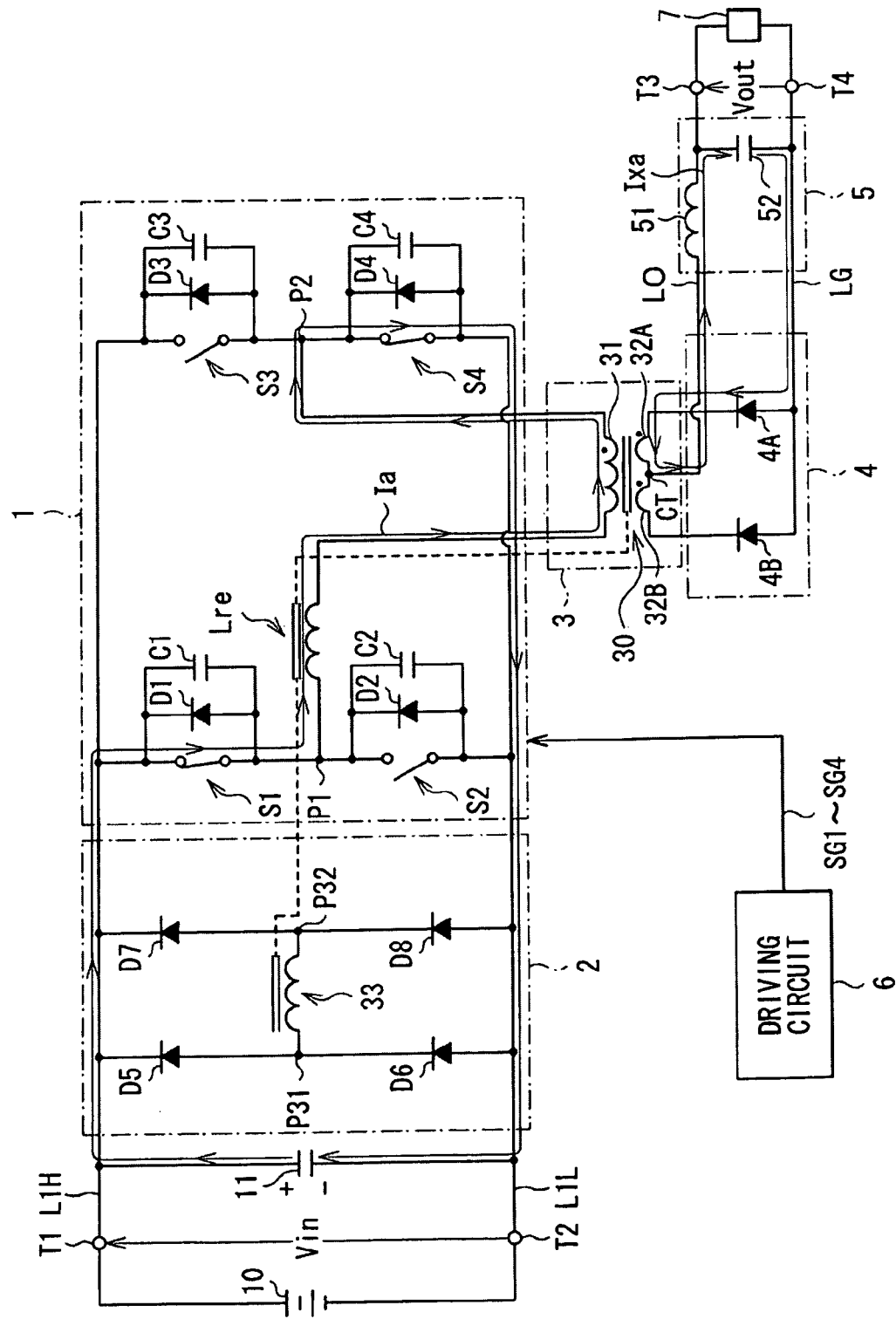
FIG. 5 is a circuit diagram for explaining the operation of the switching power supply unit of FIG. 1.

First, in the period of t0 to t1 as shown in FIG. 5, the switching element S1 and S4 are in the state of turned-on (see FIGS. 4A and 4D), and the switching element S2 and S3 are in the state of turned off (see FIGS. 4B and 4C). Here, potential VP1 at the connection point P1 is equal to Vin (see FIG. 4E), potential VP2 at the connection point P2 is equal to 0 V (see FIG. 4F), potential VP31 at the connection point P31 is equal to Vin (see FIG. 4G), and potential VP32 at the connection point P32 is equal to 0 V (see FIG. 4H). Therefore, a loop current Ia as shown in FIG. 5 flows in the bridge circuit 1 so that the inductor Lre is exited and electric power is transmitted from the primary side to the secondary side of the transformer 3. Therefore, a loop current Ixa flows to the secondary side of the transformer 3 via the rectifier diode 4A and the choke coil 51 so that the load 7 is driven. In this period, the reverse voltage V4A becomes 0 V (see FIG. 4M) because forward voltage is applied to the rectifier diode 4A, while reverse voltage V4B is applied across the rectifier diodes 4B (see FIG. 4O).

Figure 6:
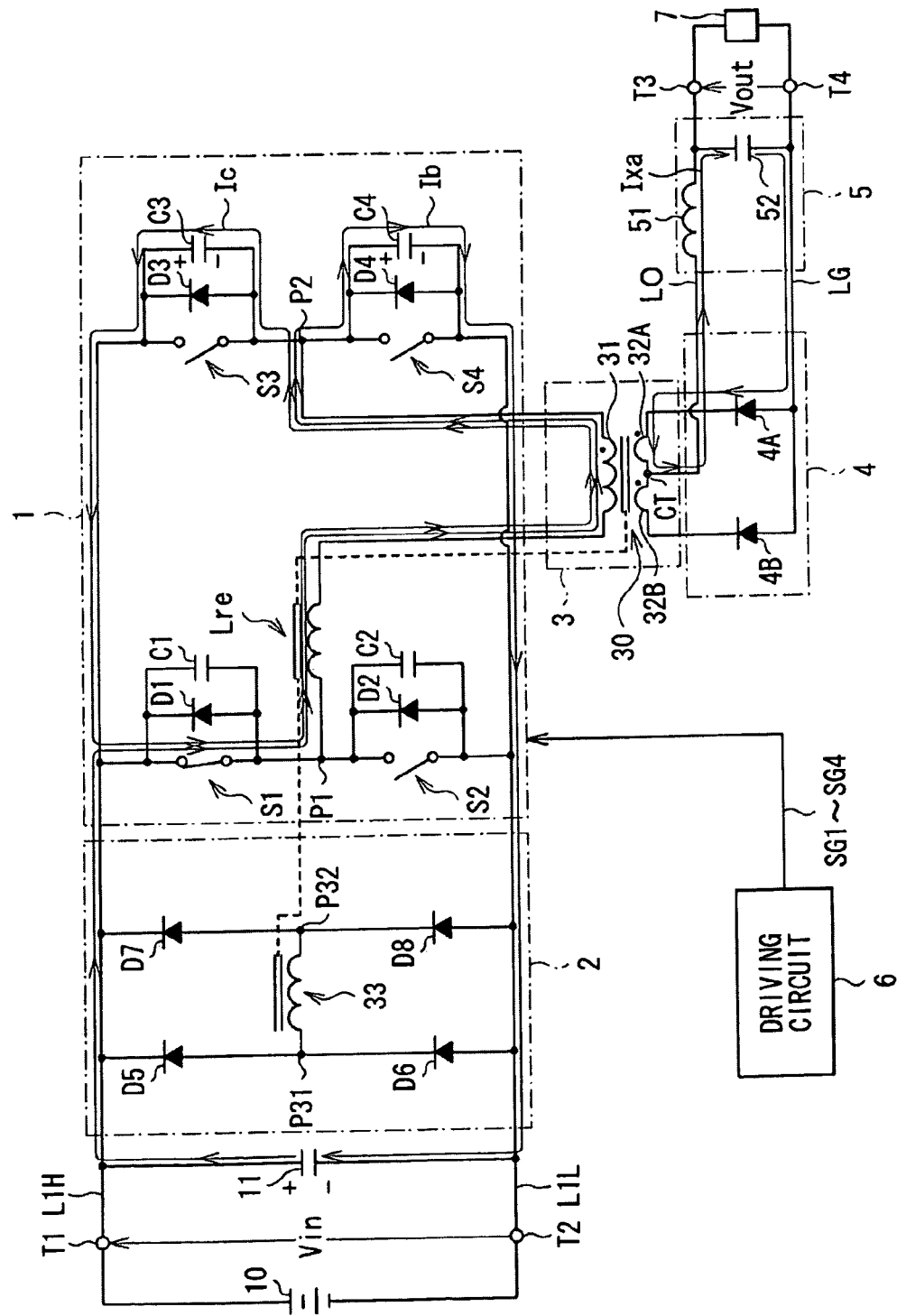
FIG. 6 is a circuit diagram for explaining the operation of the switching power supply unit subsequent to FIG. 5.

Next, in the period of t1 to t2 as shown in FIG. 6, the switching element S4 is turned off at the timing of t1 (see FIG. 4D). Then, the capacitors C3 and C4 and the inductor Lre collaborate to construct an LC series resonance circuit, and thus an LC resonance operation is performed. Accordingly, while the loop currents Ib and Ic as shown in FIG. 6 flow and the capacitor C3 is discharged, the capacitor C4 is charged. As a result, the potential VP2 at the connection point P2 gradually increases and finally gets equal to Vin (VP2=Vin) at the timing of t2 (see FIG. 4F). Mean while, the reverse voltage V4B in the rectifier diode 4B goes down gradually, and finally gets equal to 0 V (V4B=0 V) (see FIG. 4O).

Figure 7:
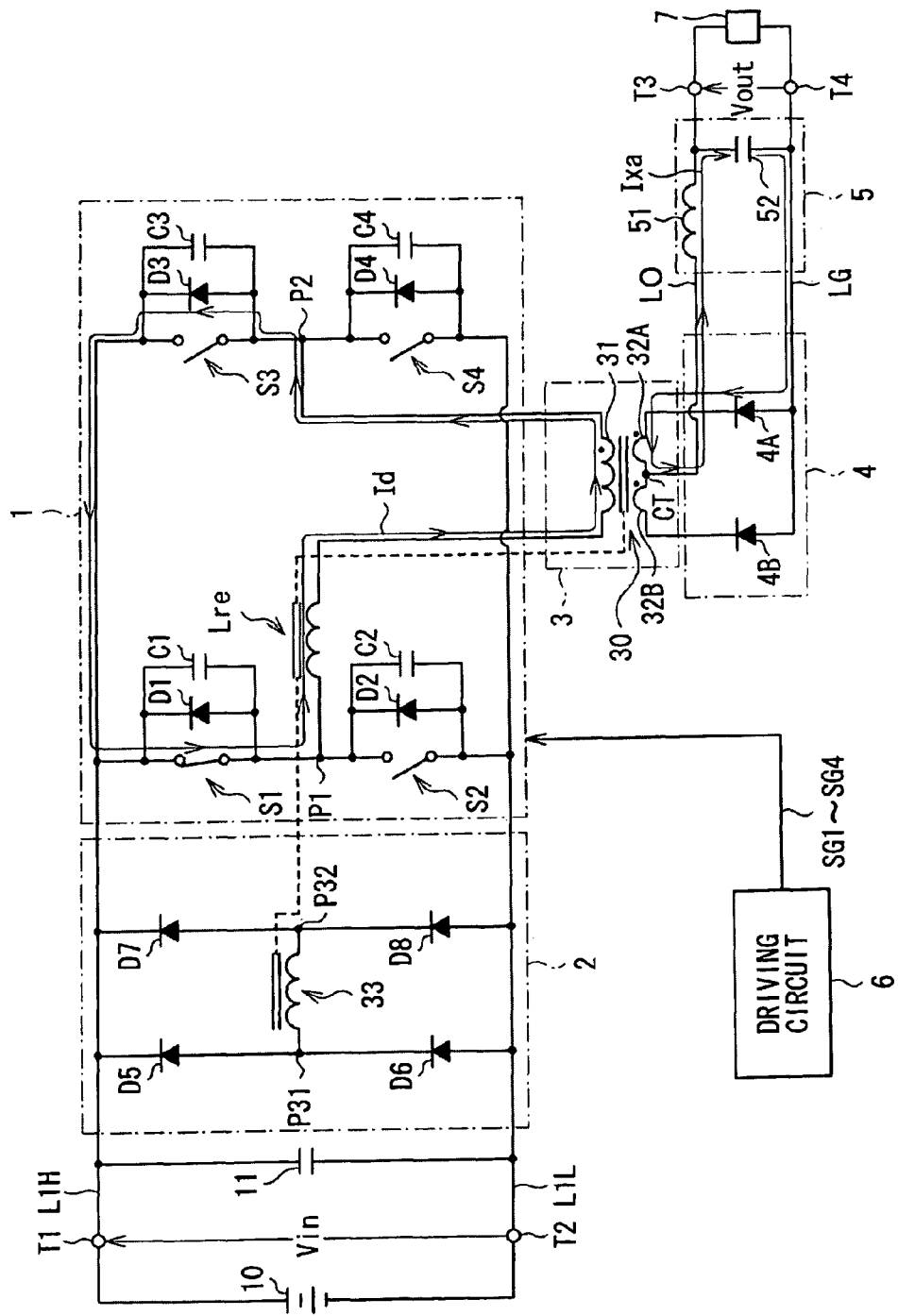
FIG. 7 is a circuit diagram for explaining the operation of the switching power supply unit subsequent to FIG. 6.
Figure 8:
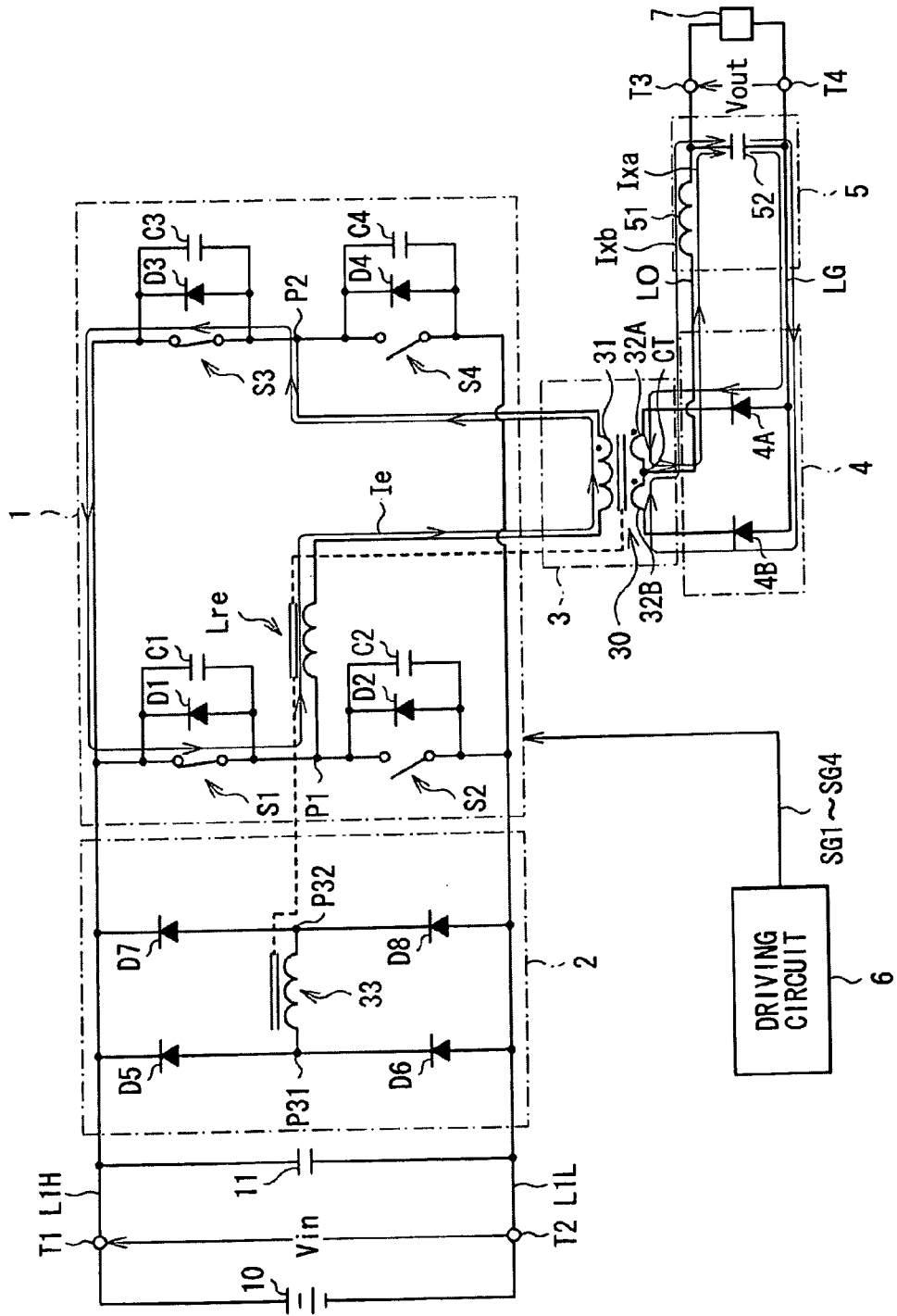
FIG. 8 is a circuit diagram for explaining the operation of the switching power supply unit subsequent to FIG. 7.

Here, when VP2 gets equal to Vin (VP2=Vin) at the timing of t2 as shown in FIG. 7, the diode D3 gets conductive. Since the switching element S3 has been turned on at the timing of t3 as shown in FIG. 8 after the VP2 gets equal to Vin and the diode D3 gets conductive, a zero volt switching (ZVS) is operated. As a result, occurrence of switching loss in the switching element S3 is suppressed.

In the period from t2 to t4, the energy stored in the inductor Lre is likely to circulate as a current in the circuit connected to both ends of the inductor Lre because of the excitation provided in the period from t0 to t1. Specifically, as shown in FIG. 8, a loop current Ie flows so that the electric potential difference from one end of the inductor Lre (on the side near the primary winding 31) to the other end of the switching element S1 (on the side near the primary side high voltage line L1H) becomes equal to each other. Here, in the electrical path of loop current Ie, the electric potential difference is a sum of the voltage V31 across both ends of the primary winding 31 and the voltage VS3 across both ends of the switching element S3. Letting "n" be the turns ratio of the primary winding and the secondary winding, the value of V31 is calculated by dividing the forward voltage drop of the rectifier diode 4A by the turns ratio "n". Meanwhile, VS3 becomes a forward voltage of the diode D3 when the switching element S3 is turned off (period from t2 to t3), and when the switching element S3 is turned on (period from t3 to t4), VS3 is calculated as a product of the on-resistance of the switching element S3 and the flowing current.

Here, it is to be noted that the value of the forward voltage drop of the diodes 4A and D3 is varied depending on the forward current value that flows and peripheral temperatures, but the loop current Ie flows so that the above-mentioned electric potential differences may become equal to each other. Moreover, the current I51 that flows through the choke coil 51 is split into a loop current Ixa flowing through the rectifier diode 4A and a loop current Ixb flowing through the rectifier diode 4B, so that the ampere's turn in the transformer 3 is uniformed and the sum of currents flowing through the secondary windings 32A and 32B becomes equal to the current I51.

Figure 9:
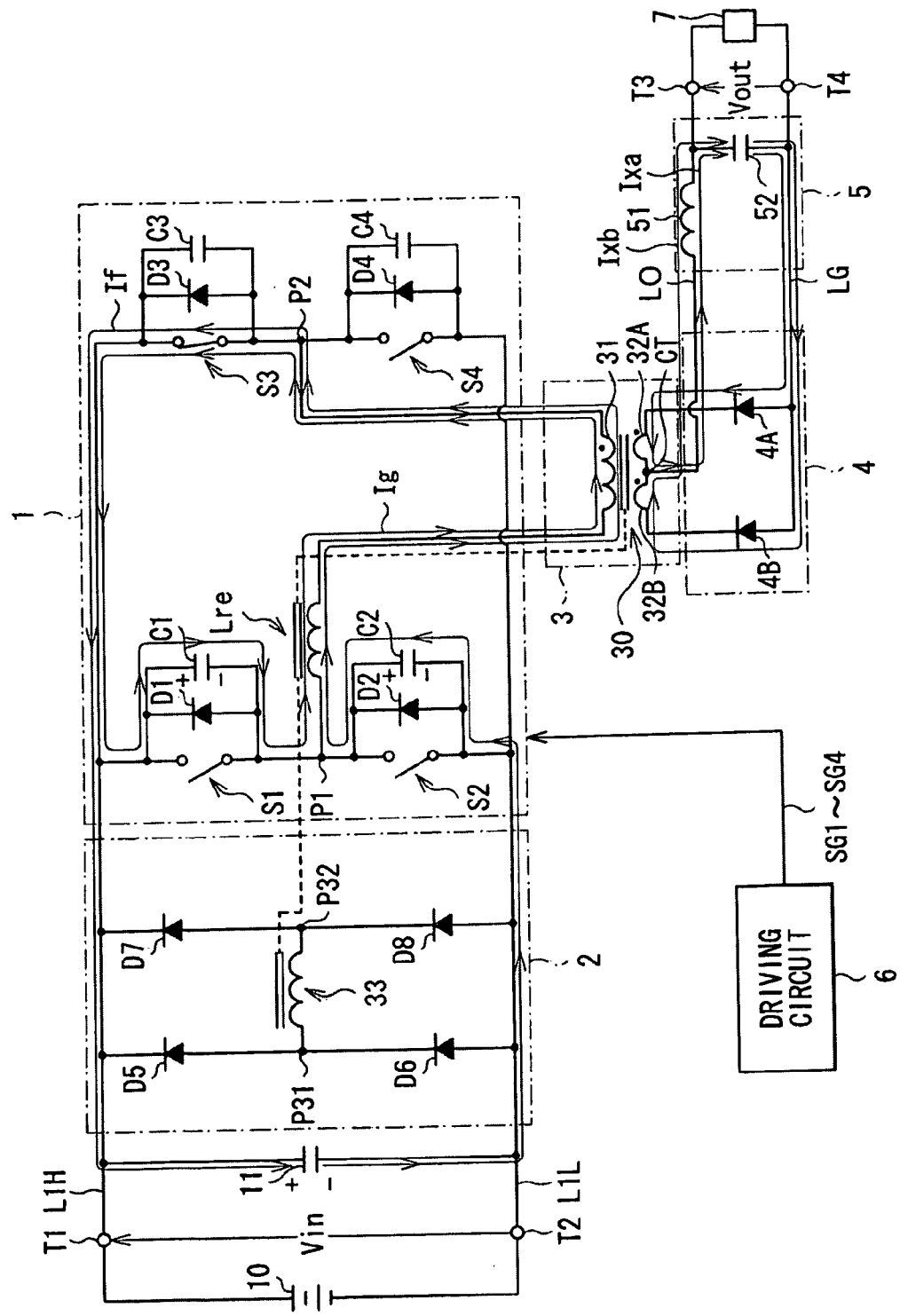
FIG. 9 is a circuit diagram for explaining the operation of the switching power supply unit subsequent to FIG. 8.

Subsequently, at the timing of t4, the switching element S1 is turned off (see FIG. 4A) as shown in FIG. 9. Then, the capacitors C1 and C2 and the inductor Lre collaborate to construct an LC series resonance circuit and an LC resonance operation is performed. Accordingly, loop currents If and Ig flow as shown in FIG. 9. Thus, the capacitor C2 is discharged and the capacitor C1 is charged, and potential VP1 of the connection point P1 goes down gradually and finally gets equal to zero volt (VP1=0V) at the timing of t5 (see FIG. 4E).

Figure 10:
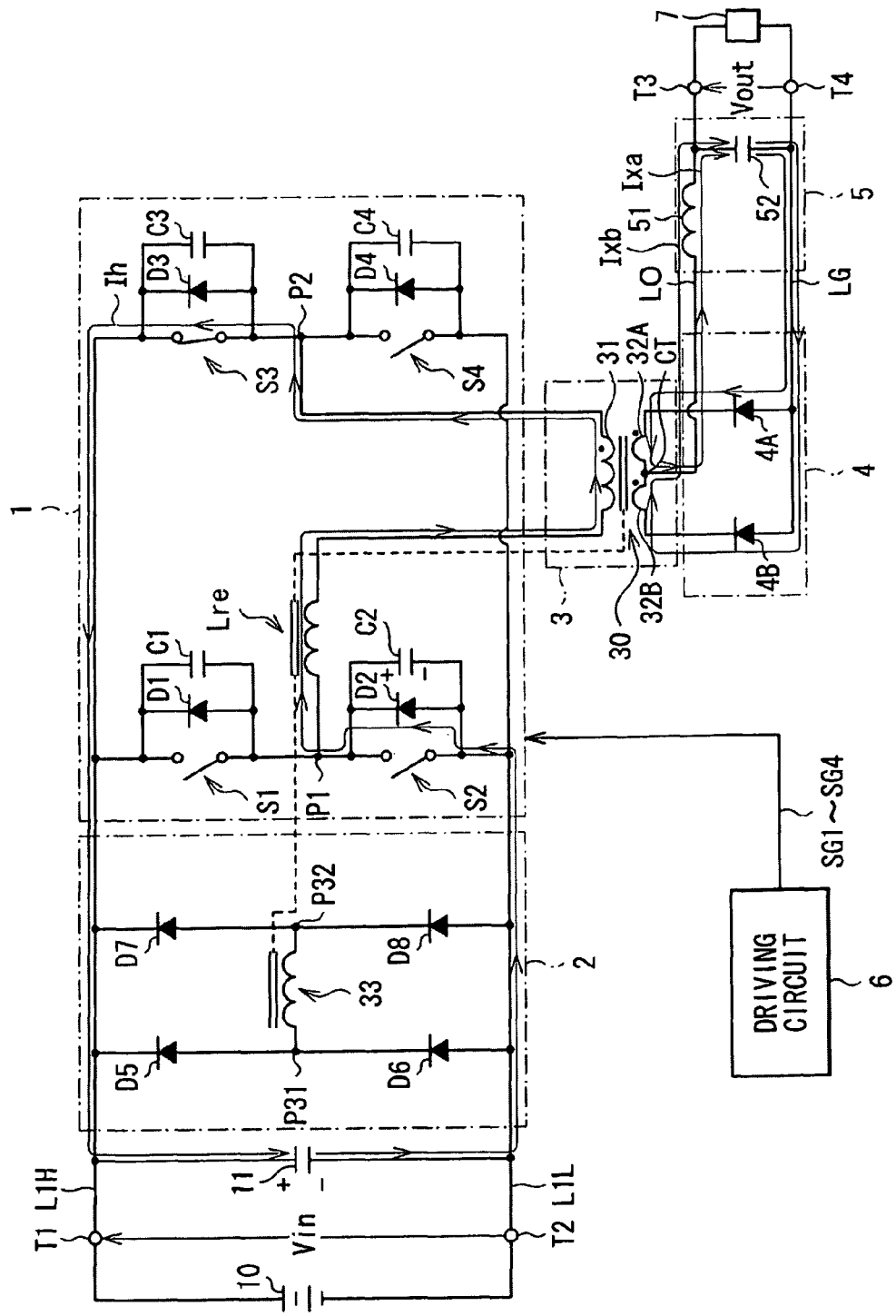
FIG. 10 is a circuit diagram for explaining the operation of the switching power supply unit subsequent to FIG. 9.
Figure 11:
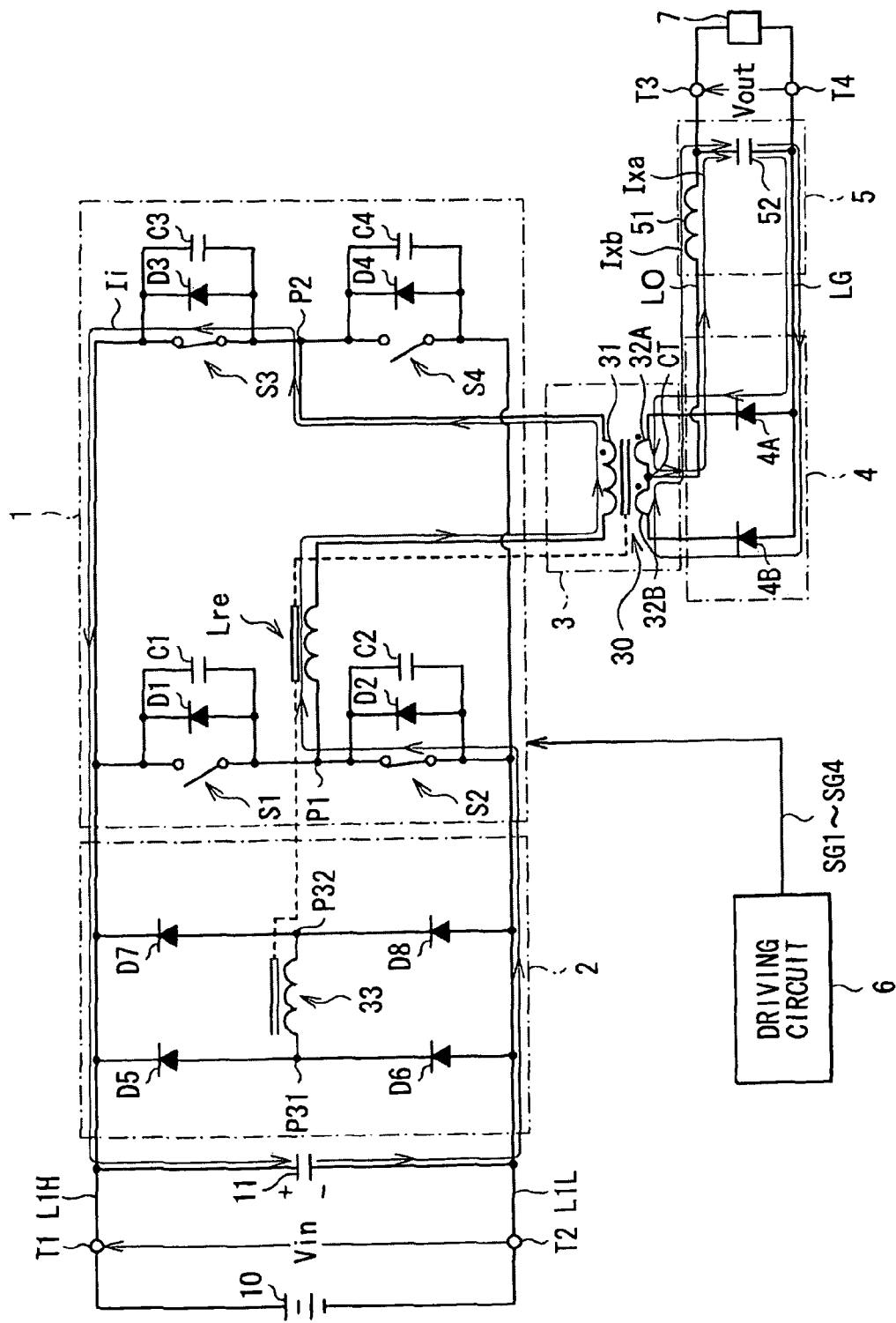
FIG. 11 is a circuit diagram for explaining the operation of the switching power supply unit subsequent to FIG. 10.

Here, when Vp1 gets equal to zero volt (VP1=0V) at the timing of t5, the diode D2 gets conductive and a loop current Ih flows as shown FIG. 10. Since the switching element S2 has been turned on (see FIG. 4B) at the timing of t6 as shown in FIG. 11 after VP1 gets equal to zero volt and the diode D2 gets conductive, a zero volt switching (ZVS) is operated. As a result, occurrence of switching loss in the switching element S2 is suppressed.

Subsequently, in the period from t6 to t7 as shown in FIG. 11, the energy stored in the inductor Lre is regenerated into the input smoothing capacitor 11 by a loop current Ii illustrated in FIG. 11, even after the charging/discharging operation of the capacitors C1 and C2 has been completed. As the energy stored in the inductor Lre is regenerated into the input smoothing capacitor 11 accompanied by decrease in energy stored in the inductor Lre, the absolute value of the current I31 flowing in the inductor Lre and the primary winding 31 also decreases (FIG. 4I). Accordingly, the current I51 that flows through the choke coil 51 is split into a loop current Ixa flowing through the rectifier diode 4A and a loop current Ixb flowing through the rectifier diode 4B so that the ampere's turn in the transformer 3 is uniformed and the sum of currents flowing through the secondary windings 32A and 32B of the transformer 3 may become equal to the current I51.

Figure 12:
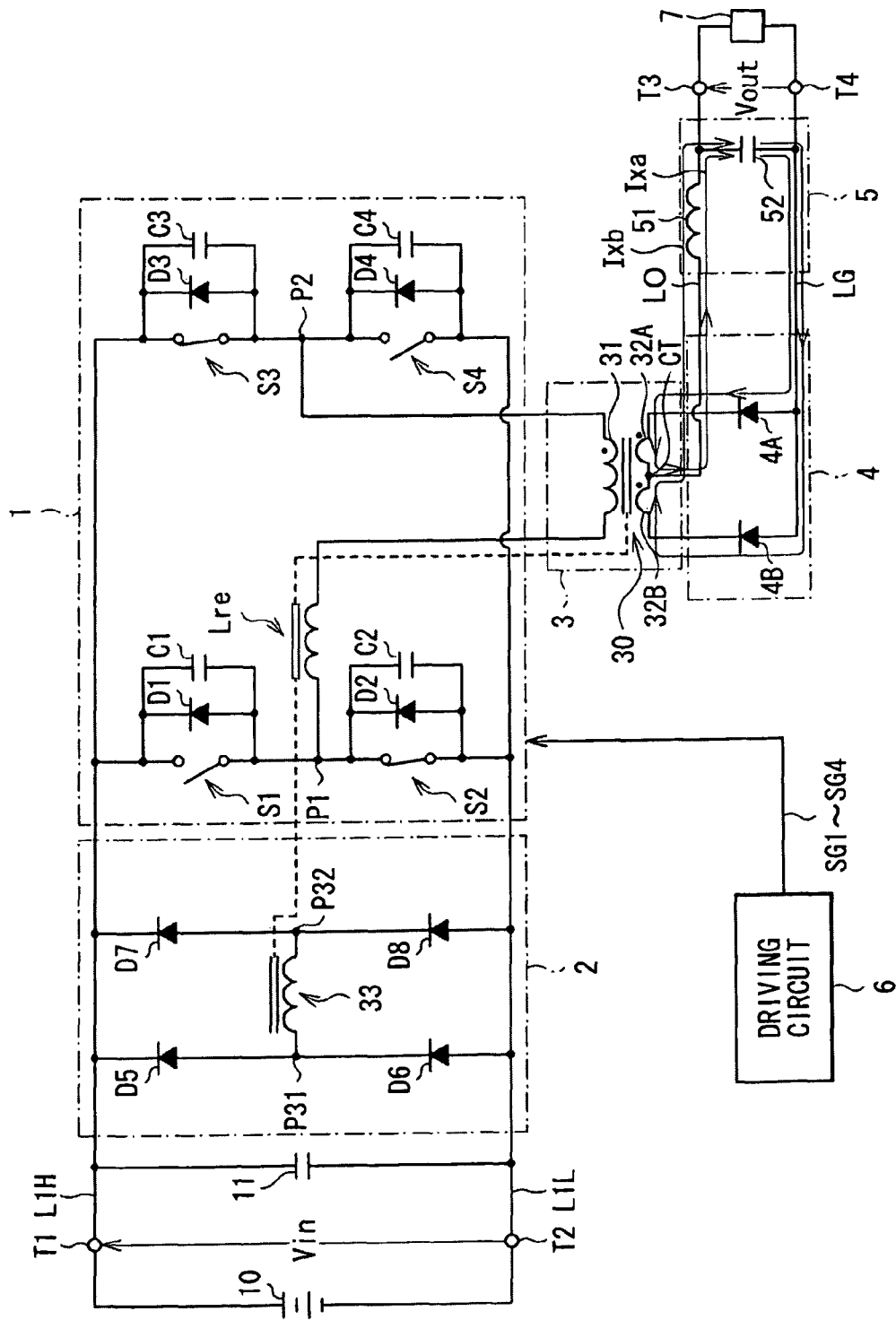
FIG. 12 is a circuit diagram for explaining the operation of the switching power supply unit subsequent to FIG. 11.
Figure 13:
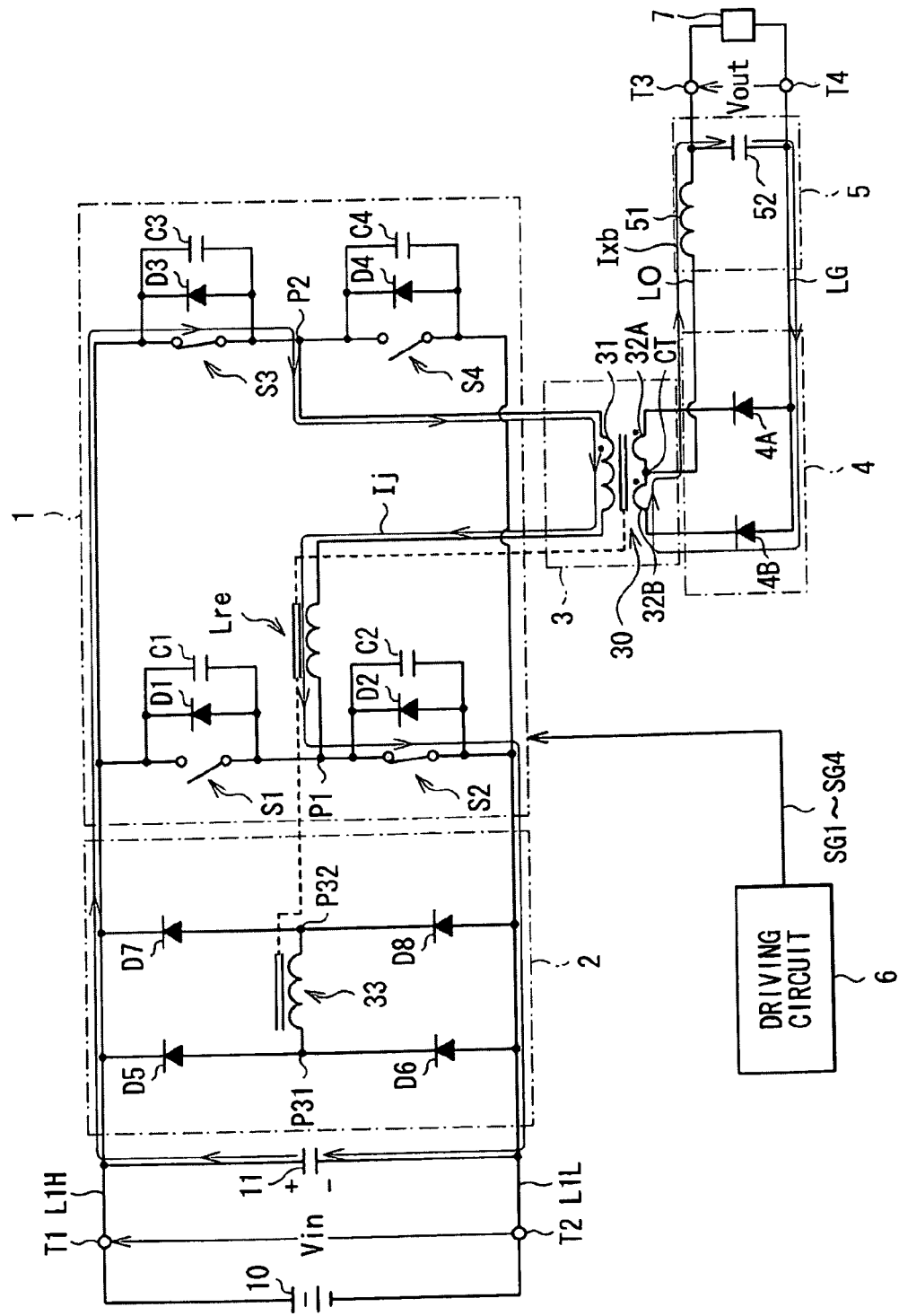
FIG. 13 is a circuit diagram for explaining the operation of the switching power supply unit subsequent to FIG. 12.

Subsequently, at the timing of t7 as shown in FIG. 12, since all the energy stored in the inductor Lre is regenerated, the current I31 flowing through the inductor Lre and the primary winding 31 gets equal to zero ampere (I31=0A) (see FIG. 4I) and the current I4A flowing through the rectifier diode 4A gets equal to the current I4B flowing through the rectifier diode 4B (see FIGS. 4N and 4P). On and after the timing of t7, the inductor Lre starts storing an energy of reverse direction. Thus, as shown in FIG. 13, a loop current Ij of a reverse direction flows through the inductor Lre and the primary winding 31 of the transformer 3, and the current I31 increases at a ratio of Vin/L (where L is the value of inductance of the inductor Lre) (see FIG. 4I). Accordingly, the current I51 that flows through the choke coil 51 is split into the loop current Ixa flowing through the rectifier diode 4A and the loop current Ixb flowing through the rectifier diode 4B so that the ampere's turn in the transformer 3 is uniformed and the sum of currents flowing through the secondary windings 32A and 32B of the transformer 3 is equal to the current I51. Here, the current I4A flowing through the rectifier diode 4A decreases gradually while the current I4B flowing through the rectifier diode 4B increases it gradually (see FIGS. 4N and 4P). When I4A gets equal to zero ampere (I4A=0A) and the current that flows through the secondary winding 32B of the transformer 3 gets equal to the current I51 that flows through the choke coil 51, the ampere's turn in this transformer 3 no more increases. Thus the increase in I31 is likely to be disturbed. However, actually, I31 continues to increase because of the function of a surge voltage suppressing circuit 2 as described hereinbelow. That timing corresponds to the timing of t8.

Subsequently, in the period from t8 to t9 as shown in FIG. 14, potential VP31 of the connection point P31 goes down gradually (see FIG. 4G) while potential VP32 of the connection point P32 goes up gradually (see FIG. 4H). Accordingly, the absolute value of the voltage V31 across both ends of the primary winding 31 of the transformer 3 increases while voltages V32A and V32B are also generated in the secondary windings 32A and 32B respectively, until reaching the equation of V32A=V32B=V31/n (where n is the turns ratio of the primary winding and secondary winding of the transformer 3) while the potential of the cathode of the rectifier diode 4B is smaller than the potential of center tap CT and the potential of the center tap CT is smaller than the potential of the cathode of the rectifier diode 4A. As mentioned above, the VP31 goes down gradually and the VP32 goes up gradually, and when the VP31 gets equal to zero volt and the VP32 gets equal to Vin, that timing corresponds to the timing of t9 (see FIGS. 4G and 4I). Then, since VP31=0V (FIG. 4G) and VP32=Vin (FIG. 4H) at the timing of t9, each voltage across both ends of the diodes D6 and D7 is zero volt to make the diodes D6 and D7 conductive, the current I33 comes to flow through the third winding 33 (see FIG. 4J).

Accordingly, in the period from t9 to t10 as shown in FIG. 15, since the diodes D6 and D7 are conductive, the voltage across both ends of the third winding 33 of the transformer 3 is clamped to Vin, and, thereby, the voltage V32B across both ends of the secondary winding 32B of the transformer is clamped to Vin/n (where n is the turns ratio of the primary winding and secondary winding of the transformer 3). Since the reverse voltage V4A applied to the rectifier diode 4A does not exceed 2*Vin/n (see FIG. 4M) because the rectifier circuit 4 has a center tap configuration. In other words, the reverse voltage V4A applied to the rectifier diode 4A may be equal to or lower than 2*Vin/n at most, thereby suppressing the raise of surge voltage.

In the period from t9 to t10, the current I51 flowing through the choke coil 51 increases in accordance with the excitation of the choke coil 51 due to the voltage V32B across both ends of the secondary winding 32B of the transformer 3, and since I32B, I51 and I31 (sum of a current I32A flowing through the secondary winding 32A and a current I32B flowing through the secondary winding 32B) are equal to one another, the current I31 also increases (see FIG. 4I). Moreover, I6 and I7 decrease due to the increase of I31 (FIG. 4L). The time when I6 and I7 gets equal to zero volt corresponds to the timing of t10. Thus, operation of the first half cycle is completed.

(2-2. Operation for Suppressing Surge Voltage in the Latter Half Cycle)

Subsequently, operation in the latter half cycle from timing t10 to t20 (t0) subsequent to the timing of t0 to t10 as shown in FIG. 2 will be explained with reference to FIG. 16.

The operation in the latter half cycle are basically similar to that in the first half cycle described with reference to FIGS. 4 to 15. Namely, in the period of t10 to t11, the switching element S2 and S3 are turned on (see FIGS. 16B and 16C) and the switching element S1 and S4 are in the off state as shown in FIGS. 16A and 16D. The potential VP1 of the connection point P1 is equal to zero volt (VP1=0V) (FIG. 16E) and the potential VP2 of the connection point P2 is equal to Vin (FIG. 16F), the potential VP31 of the connection point P31 is equal to zero volt (FIG. 16G) and the potential VP32 of the connection point P32 is equal to Vin (FIG. 16H). Therefore, a loop current flows in the bridge circuit 1 so that the inductor Lre is excited and power is transmitted from the primary side to the secondary side of the transformer 3. Thus a loop current flows to the secondary side of the transformer 3 via the rectifier diode 4B and the choke coil 51 so that the load 7 is driven. In this period, since forward voltage is applied to the rectifier diode 4B, the reverse voltage V4B gets equal to zero volt (FIG. 16O) and a reverse voltage V4A is applied to the rectifier diode 4A (FIG. 16M).

Subsequently, in the period from t11 to t12, the switching element S3 is turned off at the timing of t11 (FIG. 16C). Then, the capacitors C3 and C4 and the inductor Lre collaborate to construct an LC series resonance circuit that implements an LC resonance operation. Accordingly, the capacitor C3 is charged while the capacitor C4 is discharged by two loop currents, so that the potential VP2 of the connection point P2 goes down gradually and finally gets equal to zero volt at the timing of t12 (see FIG. 16F). At this time, the reverse voltage V4A of the rectifier diode 4A goes down gradually, and finally gets equal to zero volt at the timing of t12 (FIG. 16M).

Here, when VP2 becomes zero volt at the timing of t12 (FIG. 16F), the diode D4 gets conductive. Since the switching element S4 has been turned on at the timing of t13 (see FIG. 16D) after the VP2 gets equal to zero volt and the diode D4 gets conductive, a zero volt switching (ZVS) is operated. As a result, occurrence of switching loss in the switching element S4 is suppressed.

In the period from t12 to t14, the energy stored in the inductor Lre is likely to circulate as a current in the circuit connected to both ends of the inductor Lre because it is excited in the period from t10 to t11. Accordingly, the current is split into two loop currents, and thus the absolute value of the current I31 flowing through the primary winding 31 of the transformer 3 decreases (see FIG. 16I). Moreover, the current I51 that flows through the choke coil 51 is split into a loop current Ixa flowing through the rectifier diode 4A and a loop current Ixb flowing through the rectifier diode 4B so that the ampere's turn in the transformer 3 is uniformed and the sum of currents flowing through the secondary windings 32A and 32B of the transformer 3 gets equal to the current I51.

Subsequently, at the timing of t14, the switching element S2 is turned off (see FIG. 16B). Then, the capacitors C1 and C2 and the inductor Lre collaborate to construct an LC series resonance circuit for implementing LC resonance operation. Accordingly, because of the two loop currents flow, the capacitor C2 is charged, while the capacitor C1 is discharged, and the potential VP1 of the connection point P1 goes up gradually and finally gets equal to Vin (VP1=Vin) at the timing of t15 (see FIG. 16E).

Here, when VP1 gets equal to Vin at the timing of t15 (FIG. 16E), the diode D1 comes to be conductive. Since the switching element S1 has been turned on at the timing of t16 (see FIG. 16A) after the VP1 gets equal to Vin and the diode D1 gets conductive, a zero volt switching (ZVS) is operated. As a result, occurrence of switching loss in the switching element S1 is suppressed.

Subsequently, in the period from t16 to t17, the energy stored in the inductor Lre is regenerated into the input smoothing capacitor 11 by a loop current even after the charging/discharging operation of the capacitors C1 and C2 has been completed. As the energy stored in the inductor Lre decreases as is regenerated into the input smoothing capacitor 11, the absolute value of the current I31 flowing in the inductor Lre and the primary winding 31 also decreases (FIG. 16I). Accordingly, the current I51 that flows through the choke coil 51 is split into a loop current Ixa flowing through the rectifier diode 4A and a loop current Ixb flowing through the rectifier diode 4B so that the ampere's turn in the transformer 3 is uniformed and the sum of currents flowing through the secondary windings 32A and 32B of the transformer 3 may become equal to the current I51.

Subsequently, at the timing of t17, since the energy stored in the inductor Lre is all regenerated, the current I31 flowing through the inductor Lre and the primary winding 31 gets equal to zero ampere (I31=0A) (see FIG. 16I) and the current I4A flowing through the rectifier diode 4A gets equal to the current I4B flowing through the rectifier diode 4B ((see FIGS. 16N and 16P). On and after the timing of t17, the inductor Lre starts storing energy of a reverse direction. Thus, a loop current of a reverse direction starts flowing through the inductor Lre and the primary winding 31 of the transformer 3, and the current I31 increases at a ratio of Vin/L (where L is the value of inductance of the inductor Lre) (see FIG. 16I). Accordingly, the current I51 that flows through the choke coil 51 is split into the loop current Ixa flowing through the rectifier diode 4A and the loop current Ixb flowing through the rectifier diode 4B so that the ampere's turn in the transformer 3 is uniformed and the sum of currents flowing through the secondary windings 32A and 32B of the transformer 3 is equal to the current I51. Here, the current I4B flowing through the rectifier diode 4B decreases gradually while the current I4A flowing through the rectifier diode 4A increases gradually (see FIGS. 16N and 16P). When I4B gets equal to zero ampere (I4B=0A) and the current that flows through the secondary winding 32A of the transformer 3 gets equal to the current I51 that flows through the choke coil 51, the ampere's turn in this transformer 3 no more increases. As a result, the current I31 is less likely to increase any more. However, actually, I31 continues to increase due to the function of a surge voltage suppressing circuit 2 as described hereinbelow. That timing corresponds to the timing of t18.

Subsequently, in the period from t18 to t19, potential VP32 of the connection point P32 goes down gradually (see FIG. 16H) while potential VP31 of the connection point P31 goes up gradually (see FIG. 16G). Accordingly, the voltage V31 across both ends of the primary winding 31 of the transformer 3 increases while voltages V32A and V32B are also generated in the secondary windings 32A and 32B respectively. As mentioned above, the VP32 goes down gradually and the VP31 goes up gradually and when the VP32 gets equal to zero volt and the VP31 gets equal to Vin, that timing corresponds to the timing of t19 (see FIGS. 16G and 16I). Then, since VP32=0V (see FIG. 16H) and VP31=Vin (see FIG. 16G) at the timing of t19, each voltage across both ends of the diodes D5 and D8 is zero volt to make the diodes D5 and D8 conductive, the current I33 comes to flow through the third winding 33 (see FIG. 16J).

Accordingly, in the period from t19 to t20, since the diodes D5 and D8 are conductive, the voltage across both ends of the third winding 33 of the transformer 3 is clamped to Vin, and, thereby, the voltage V32A across both ends of the secondary winding 32A of the transformer is clamped to Vin/n (where n is the turns ratio of the primary winding and secondary winding of the transformer 3). Thus the reverse voltage V4B applied to the rectifier diode 4B does not exceed 2*Vin/n (see FIG. 16O) because the rectifier circuit 4 has a center tap configuration. In other words, the reverse voltage V4B applied to the rectifier diode 4B may be equal to or lower than 2*Vin/n at most, thereby suppressing the raise of surge voltage.

In the period from t19 to t20, the current I51 flowing through the choke coil 51 increases as the choke coil 51 is excited due to the voltage V32A across both ends of the secondary winding 32A of the transformer 3, and thus the current I31 also increases (see FIG. 16I). Meanwhile, I5 and I8 decrease due to the increase of I31 (see FIG. 16K). The time when I5 and I8 gets equal to zero volt (see FIG. 16K) corresponds to the timing of t20. Thus, operation of the latter half cycle is completed, and returns to the initial state of the timing of t0 of FIG. 4.

(2-3. Comparison of Functions Between the Present Embodiment and Comparative Examples)

Subsequently, a function of suppressing a surge voltage applied to the rectifier diode in the switching power supply unit of the present embodiment will be compared in detail with a function of suppressing a surge voltage in the switching power supply unit of related art (shown by Comparative examples 1 and 2), with reference to FIGS. 17 and 18.

Function of Comparative Examples

Figure 17:
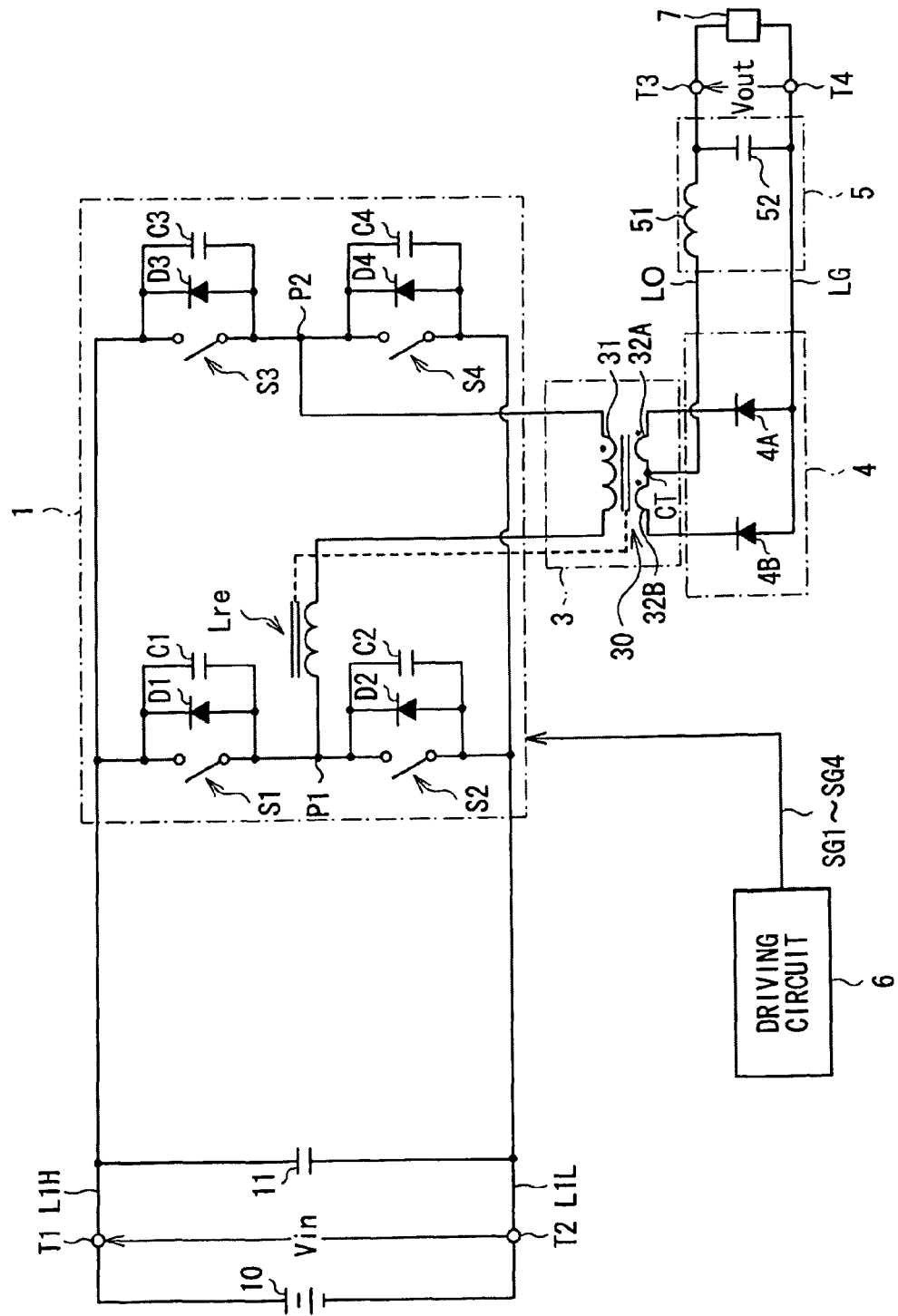
FIG. 17 is a circuit diagram showing a configuration of a switching power supply unit according to Comparative Example 1.
Figure 18:
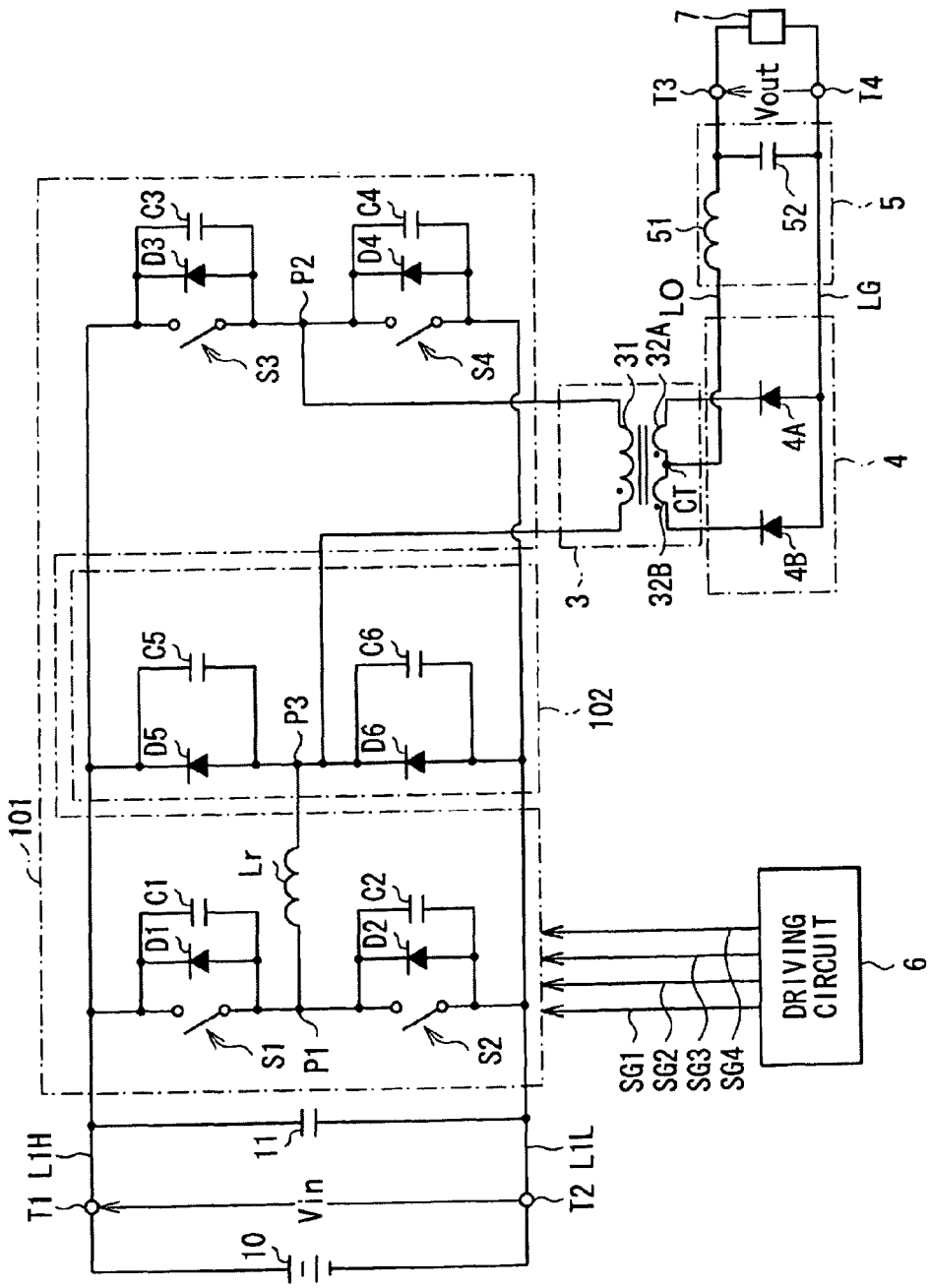
FIG. 18 is a circuit diagram showing a configuration of a switching power supply unit according to Comparative Example 2.

Here, FIGS. 17 and 18 illustrate a circuit configuration of a switching power supply unit according to Comparative examples 1 and 2 respectively. Specifically, Comparative example 1 corresponds to a case where the surge voltage suppressing circuit 2 of the present embodiment is excluded. Comparative example 2 corresponds to a case where a surge voltage suppressing circuit 102, which is formed by connecting in series two element pairs, one of the element pairs including a diode D5 and a capacitor C5 connected in parallel and the other element pair including a diode D6 and a capacitor C6 connected in parallel, is provided in substitution for the surge voltage suppressing circuit 2.

First, in Comparative example 1 of FIG. 17, a zero volt switching (ZVS) operation is implemented by LC resonance operation by utilizing the electrostatic capacity (capacitors C1 to C4) between the drain and sources in the switching elements S1 to S4 and a leakage inductance Lre of the transformer 3. In this manner, occurrence of switching loss in the switching elements S1 to S4 can be suppressed.

However, since leakage inductance Lre of the transformer 3 is utilized as an inductance component for resonance, it is difficult to separate the ideal transformer portion constituted from coupling between the primary winding 31 and the secondary windings 32A and 32B from the leakage inductance Lre. Thereby, the resonance operation is performed by the capacity component across both-end terminals of the ideal transformer portion and the leakage inductance Lre, which may bring about a surge voltage applied to the rectifier diodes 4A and 4B.

Meanwhile, in Comparative example 2 of FIG. 18, the above-mentioned ZVS operation is implemented by employing a highly-coupled transformer 3 and also by a resonance inductor Lr provided separately from the transformer 3 as an inductance component for LC resonance. Here, when the resonance operation is performed by the capacity component across both-end terminals in the transformer 3 and the resonance inductor Lr, the connection point P3 between the transformers 3 and the resonance inductor Lr is likely to resonate with twice as large amplitude as DC input voltage Vin. In this case, when voltage of the connection point P3 between the transformer 3 and the resonance inductor Lr is on the point of exceeding a DC input voltage Vin, the diodes D5 and D6 are operated to clamp to the DC input voltages Vin, thereby suppressing the occurrence of surge voltage in the rectifier diodes 4A and 4B.

However, such method has an issue of increasing number of components in the unit because it needs to provide the resonance inductor Lr separately from the transformer 3.

Function of the Present Embodiment

On the other hand, according to the present embodiment, magnetic coupling between the primary windings 31A to 31D and the secondary windings 32A and 32B, and the magnetic coupling between the primary windings 31A to 31D and the third windings 33A and 33B are loose compared with that of the secondary windings 32A and 32B and the third windings 33A and 33B. Thus, a leakage inductance component (inductor Lre) is generated in the transformer 3. Accordingly, resonance operation is available by an LC resonance circuit formed with the inductor Lre and the capacity components (capacitors C1 to C4) across both ends of the switching elements S1 to S4. Thus ZVS operation is implemented without preparing an inductor separately from the transformer 3 like Comparative example 2. Moreover, owing to a function of clamping to a voltage across both ends of the third winding 33, which is brought about by the diodes D5 to D8 in the surge voltage suppressing circuit 2, occurrence of surge voltage applied to the rectifier diodes 4A and 4B, which is caused by the resonance operation by the capacity component across both ends of terminals in the transformer 3 and the inductor Lre, may be suppressed.

As described above, according to the present embodiment, magnetic coupling between the primary windings 31A to 31D and the secondary windings 32A and 32B, and magnetic coupling between the primary windings 31A to 31D and the third windings 33A and 33B are looser than that of the secondary windings 32A and 32B and the third windings 33A, and 33B respectively. In this manner, an LC resonance circuit is formed by leakage inductance component (inductor Lre) thus generated and the capacity components (capacitors C1 to C4) across both ends of the switching elements S1 to S4. Thus, ZVS operation may be available without providing an inductor separately from the transformer 3. In addition, since the surge voltage suppressing circuit 2 is provided, there occurs a function of clamping to a voltage across both ends of the third winding 33, which is brought about by the diodes D5 to D8, and thus surge voltage that will be applied to the rectifier diodes 4A and 4B due to resonance operations by the capacity component across both ends of terminals in the transformer 3 and the inductor Lre may be suppressed. Accordingly, occurrence of switching loss in the switching elements S1 to S4 and occurrence of surge voltage that will be applied to the rectifier diodes 4A and 4B may be suppressed while reducing the number of components in the unit.

In addition, loss in the rectifier device may be reduced and efficiency of the power supply unit may be improved because of the reduction of surge voltage. In addition, heat generation in the device may also be suppressed by reducing the loss in rectifier devices.

In addition, a rectifier device (rectifier diode) having a low withstand voltage may be used because of the suppressed surge voltage, so that the parts cost reduction is available.

Subsequently, examples of modification according to the present invention will be explained hereinbelow. Here, the same reference numerals as in the above embodiment have been used to indicate substantially identical components, and descriptions will be appropriately omitted.

[Modification 1]
(Whole Configuration Example of Switching Power Supply Unit)

Figure 19:
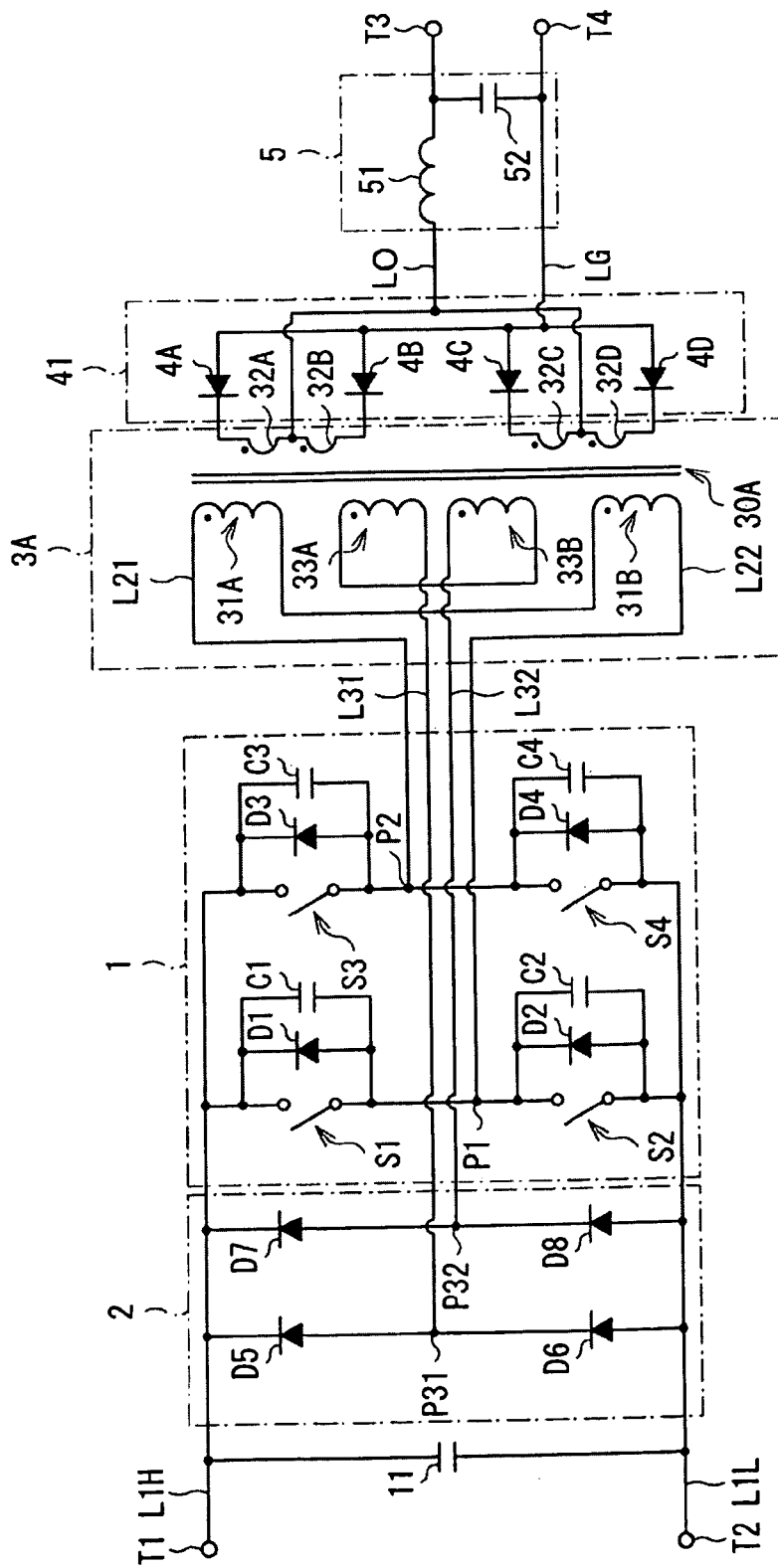
FIG. 19 is a circuit diagram showing a configuration (configuration of an equivalent circuit) of a switching power supply unit according to Modification 1 of the present invention.

FIG. 19 illustrates a configuration of a switching power supply unit (configuration of equivalent circuit) according to Modification 1 of the present invention. In the switching power supply unit of the present modification, a transformer 3A and a rectifier circuit 41 to be described later are employed in substitution for the transformer 3 and the rectifier circuit 4 of the switching power supply unit according to the above-mentioned embodiment.

The transformer 3A includes a magnetic core 30A) constituted from an upper core UCA and a lower core DCA that are facing each other as described later, two primary windings 31A and 31B, four secondary windings 32A to 32D and two third windings 33A and 33B. Here, similar to the above-mentioned embodiment, magnetic coupling between the primary windings 31A and 31B and the secondary windings 32A to 32D and magnetic coupling between the primary windings 31A and 31B and the third windings 33A and 33B are looser than that of the secondary windings 32A to 32D and the third windings 33A and 33B. Namely, the magnetic coupling between the primary windings 31A and 31B and the secondary windings 32A to 32D and the magnetic coupling between the primary windings 31A and 31B and the third windings 33A and 33B are loose while the magnetic coupling between the secondary windings 32A to 32D and the third windings 33A and 33B is tight. Here, the primary windings 31A and 31B are connected to each other in series. Specifically, one end of the primary winding 31A is connected to a connection point P2 via the connection line L21 and the other end thereof is connected to one end of the primary winding 31B. The other end of the primary winding 31B is connected to a connection point P1 via an inductor Lre and a connection line L22. In the secondary side of the transformer 3A, the secondary windings 32A and 32B are connected to each other in series while the secondary windings 32C and 32D are connected to each other in series. Specifically, one end of the secondary winding 32A is connected to the cathode of a rectifier diode 4A to be described later while one end of the secondary winding 32B is connected to the cathode of a rectifier diode 4B to be described later. The other ends of these secondary windings 32A and 32B are connected to each other and led to an output line LO. One end of the secondary winding 32C is connected to the cathode of a rectifier diode 4C to be described later while the other end of the secondary winding 32D is connected to the cathode of a rectifier diode 4D to be described later. The other ends of these secondary windings 32C and 32D are connected to each other and led to the output line LO. Further, one end of the third winding 33A is connected to a connection point P31 via a connection line L31 and the other end is connected to one end of the third winding 33B. The other end of the third winding 33B is connected to a connection point P32 via a connection line L32.

The rectifier circuit 41 is a single-phase full-wave rectifier constituted from four rectifier diodes 4A to 4D. The cathode of the rectifier diode 4A is connected to one end of the secondary winding 32A while the cathode of the rectifier diode 4B is connected to one end of the secondary winding 32B. The anodes of these rectifier diodes 4A and 4B are connected to each other and led to a ground line LG. Moreover, the cathode of the rectifier diode 4C is connected to one end of the secondary winding 32C and the cathode of the rectifier diode 4D is connected to one end of the secondary winding 32D. The anodes of these rectifier diodes 4C and 4D are connected to each other and led to the ground line LG. That is, the rectifier circuit 41 has a configuration of anode-common-connection of a center-tap type, in which the rectifier diodes 4A to 4D rectify the outputted AC voltages supplied from the transformer 3A in each half wave period thereof.

In the transformer 3A and the rectifier circuit 41, it is not always necessary to dispose the secondary windings 32A and 32B and the rectifier diodes 4A and 4B.

(Detailed Configuration of Transformer 3A)

Figure 20:
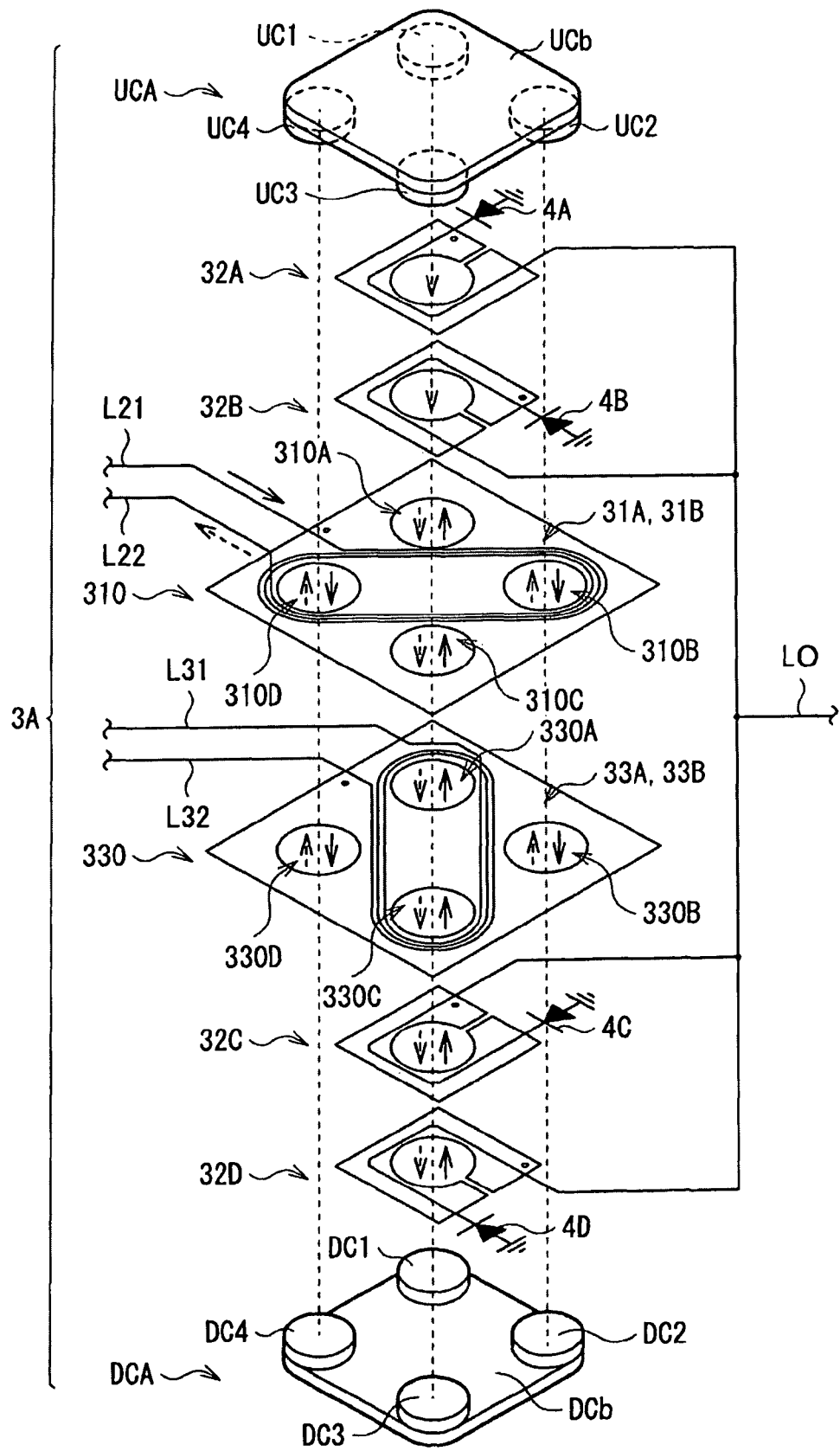
FIG. 20 is an exploded perspective view showing an external appearance configuration of the principal part of a transformer illustrated in FIG. 19.

Subsequently, the detailed configuration of the transformer 3A according to the present modification will be described hereinbelow with reference to FIGS. 20 to 22. FIG. 20 is an exploded perspective view showing an external appearance configuration of the principal part of the transformer 3A. FIG. 21 is a table indicating an example of the coupling coefficient between each winding in the transformer 3A. FIG. 22 schematically illustrates an example of reflux of flux paths that are formed in the transformer 3A.

As shown in FIG. 20, in the transformer 3A, with respect to the core material (magnetic core 30A) constituted from an upper core UCA and a lower core DCA that are facing each other, a printed coil 310 that constitutes the primary windings 31A and 31B, and four metal plates that respectively constitute the secondary windings 32A to 32D, and a printed coil 330 that constitutes the third winding 33A and 33B are wound around, in a plane (in a horizontal plane) perpendicular to the extending direction (vertical direction) of four leg portions to be described hereinbelow. The upper core UCA is constituted from a base core UCb and four leg portions extended from the base core UCb in the above-mentioned vertical direction (penetrating direction), that is, a first leg portion UC1, a second leg portion UC2, a third leg portion UC3 and a fourth leg portion UC4. The lower core DCA is constituted from a base core DCb and four leg portions extended from the base core DCb in the above-mentioned vertical direction (penetrating direction), that is, a first leg portion DC1, a second portion DC2, a third leg portion DC3 and a fourth leg portion DC4. The first leg portions UC1 and DC1, the second leg portions UC2 and DC2, the third leg portions UC3 and DC3 and the fourth leg portions UC4 and DC4 are separately disposed in pairs along two cross lines (two diagonal lines) on the mutually-facing surfaces of the base cores UCb and DCb. These four leg portions UC1 to UC4 and DC1 to DC4 have a function of magnetically connecting the mutually-facing two base cores UCb and DCb. Specifically, here, the first leg portions UC1 and DC1, the second leg portions UC2 and DC2, the third leg portions UC3 and DC3 and the fourth leg portions UC4 and DC4 are each disposed to constitute the four corners of square plane of the base cores UCb and DCb. Namely, the four leg portions are disposed at the four corners of the base cores UCb and DCb of a rectangular shape (square). The first leg portions UC1 and DC1 and the third leg portions UC3 and DC3 are disposed at both ends of one diagonal line to form a leg portion pair (first leg portion pair), while the second leg portions UC2 and DC2 and the fourth leg portions UC4 and DC4 are disposed at both ends of the other diagonal line to form a leg portion pair (second leg portion pair). The upper core UCA and the lower core DCA are each made of a magnetic material such as ferrite, and the printed coils 310 and 330 and the four metal plates to be described hereinbelow are made of a conductive material such as copper and aluminum, for example.

The printed coil 310 has four through-holes 310A to 310D through which the leg portions UC1 to UC4 and DC1 to DC4 are passing respectively. The first leg portion UC1 and DC1 are passing through the through-hole 310A, the second leg portions UC2 and DC2 are passing through the through-hole 310B, the third leg portions UC3 and DC3 are passing through the through-hole 310C, and the fourth leg portions UC4 and DC4 are passing through the through-hole 310D. Moreover, in the printed coil 310, the primary windings 31A and 31B are wound around the second leg portions UC2 and DC2 and the fourth leg portions UC4 and DC4 and connected from the connection line L21 toward the connection line L22.

The printed coil 330 is disposed between the printed coil 310 and the lower core DCA and includes four through-holes 330A to 330D through which the leg portions UC1 to UC4 and DC1 to DC4 are passing respectively. The first leg portion UC1 and DC1 are passing through the through-hole 330A, the second leg portions UC2 and DC2 are passing through the through-hole 330B, the third leg portions UC3 and DC3 are passing through the through-hole 330C, and the fourth leg portions UC4 and DC4 are passing through the through-hole 330D. Moreover, in this printed coil 330, the third windings 33A and 33B are wound around the first leg portions UC1 and DC1 and the third leg portions UC3 and DC3 and connected from the connection line L31 towards the connection line L32.

The two metal plates that constitute the secondary windings 32A and 32B are disposed between the printed coil 310 and the upper core UCA. These metal plates each include a through-hole through which the leg portions UC3 and DC3 are passing. Moreover, two metal plates that constitute the secondary windings 32C and 32D are disposed between the printed coil 330 and the lower core DCA. These metal plates each include a through-hole through which the leg portions UC1 and DC1 are passing.

In this configuration, in the transformer 3A, the magnetic coupling between the primary windings 31A and 31B and the secondary winding 32A to 32D and the magnetic coupling between the primary windings 31A and 31B and the third windings 33A and 33B are loose, while the magnetic coupling of the secondary windings 32A to 32D and the third windings 33A and 33B is tight, as shown in FIG. 21 for example.

In addition, the primary windings 31A and 31B, the secondary windings 32A to 32D and the third windings 33A and 33B are configured to be pulled out from outside via wirings (the connection lines L21 and L22, the output line LO and the ground line LG), in the in-plane direction of the printed coils 310 and 330 and the four metal plates.

Figure 22A:
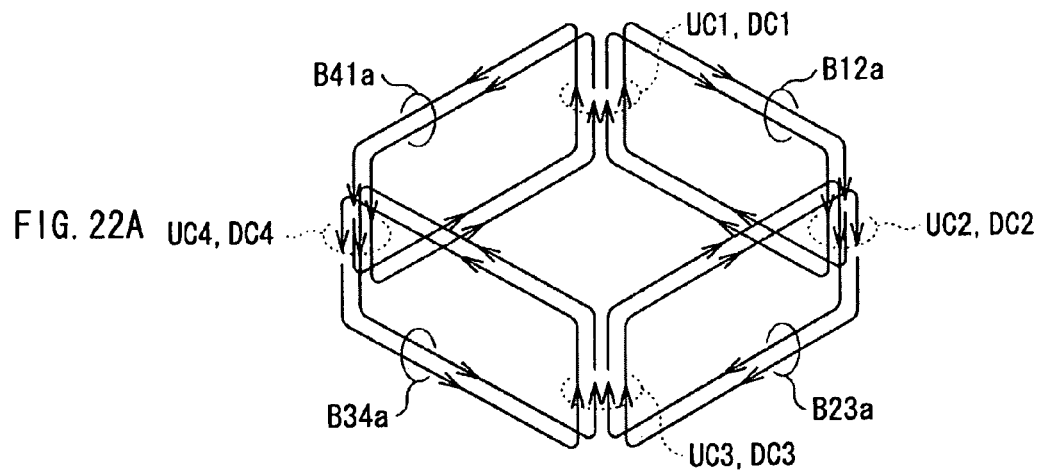
FIGS. 22A and 22B are pattern diagrams showing an example of reflux of flux paths that are formed in the transformer of FIG. 19.
Figure 22B:
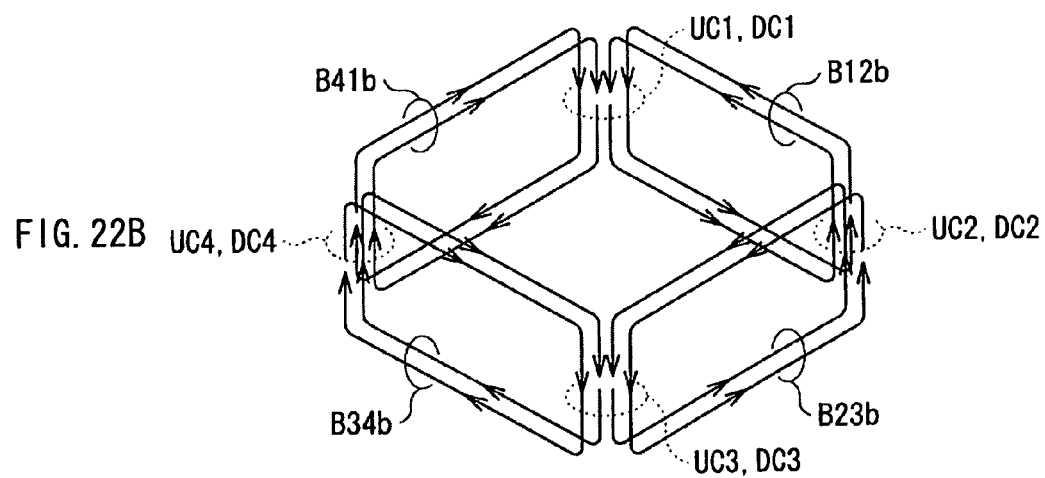

In such configuration, in the transformer 3A, because of currents flowing through the primary windings 31A and 31B, the secondary windings 32A to 32D and the third windings 33A and 33B, a flux path (reflux of flux path) is formed in the inside of the four leg portions UC1 to UC4 and DC1 to DC4 and the two base cores UCb and DCb, as shown by arrows indicated in FIGS. 20 and 22, for example. Thus, a magnetic flux is formed in the four leg portions UC1 to UC4 and DC1 to DC4 in the penetrating direction thereof. As for the arrows illustrated in the through-holes 310A to 310D and 330A to 330D of FIG. 20 to represent the direction of magnetic flux, the solid lines correspond to the magnetic flux formed at the time that currents flow from the connection line L21 in the direction of solid line arrow, while the broken lines correspond to the magnetic flux formed at the time that currents flow from the connection line L22 in the direction of broken line arrow. FIG. 22A shows the reflux of the flux path formed at the time that the currents flow from the connection line L21 in the direction of solid line arrow, and FIG. 22B shows the reflux of the flux path formed at the time that the currents flow from the connection line L22 in the direction of broken line arrow. Here, the direction of the magnetic fluxes are the same direction in the first leg portion pair constituted from the first leg portions UC1 and DC1 and the third leg portions UC3 and DC3, while the direction of the magnetic fluxes are the same in the second leg portion pair constituted from the second leg portions UC2 and DC2 and the fourth leg portions UC4 and DC4. In addition, it is to be noted that the directions of the magnetic fluxes are opposite to each other between the first leg portion pair and the second leg portion pair. In other words, the magnetic fluxes generated inside the first leg portions UC1 and DC1 and the third leg portions UC3 and DC3 are both directed in a first direction, while the magnetic flux produced inside the second leg portions UC2 and DC2 and the fourth leg portions UC4 and DC4 are both directed in a second direction opposite to the first direction. Further, as shown in FIG. 22 for example, there are four annular magnetic paths formed such as annular magnetic paths B12a and B12b passing through the inside of the first leg portions UC1 and DC1 and the second leg portions UC2 and DC2, the annular magnetic paths B23a and B23b passing through the inside of the second leg portions UC2 and DC2 and the third leg portions UC3 and DC3, annular magnetic paths B34a and B34b passing through the inside of the third leg portions UC3 and DC3 and the fourth leg portions UC4 and DC4, and annular magnetic paths B41a and B41b passing through the inside of fourth leg portions UC4 and DC4 and the first leg portions UC1 and DC1. Namely, the annular magnetic paths B12a and B12b and the annular magnetic paths B41a and B41b are shared by the first leg portions UC1 and DC1, the annular magnetic paths B12a B12b and the annular magnetic paths B23a and B23b are shared by the second leg portions UC2 and DC2, the annular magnetic paths B23a and B23b and the annular magnetic paths B34a and B34b are shared by the third leg portions UC3 and DC3, and the annular magnetic path B34a and B34b and the annular magnetic paths B41a and B41b are shared by the fourth leg portions UC4 and DC4. In other words, four flux paths, each passing in one direction through adjacent two of the four leg portions UC1 to UC4 and DC1 to DC4 and through the two base cores UCb and DCb, are formed in the four leg portions UC1 to UC4 and DC1 to DC4 and the two base cores UCb and DCb. As described in detail hereinafter, formation areas of these four annular magnetic paths go around the four leg portions in the base cores UCb and DCb.

Here, the core material (magnetic core 30A) constituted from the upper core UCA and the lower core DCA corresponds to a specific example of "magnetic core" of the present invention. In addition, the printed coil 310 corresponds to a specific example of "first conductive member" of the invention, and the four metal plates that constitute the secondary windings 32A to 32D correspond to a specific example of "second conductive member" of the invention, and the printed coil 330 corresponds to the a specific example of "third conductive member" of the invention. In addition, the base cores UCb and DCb correspond to a specific example of "two base portions" of the invention, and first leg portions UC1 and DC1, the second leg portions UC2 and DC2, the third leg portions UC3 and DC3 and the fourth leg portions UC4 and DC4 correspond to a specific example of "four leg portions" of the invention.

Subsequently, functions and effects of the switching power supply unit according to the modification will be explained. Since fundamental operation and surge voltage suppressing operation of the switching power supply unit is substantially similar to that of the above-mentioned embodiment, description will be omitted suitably as necessary, and functions and effects of the transformer 3A will be described in particular.
(Function of Transformer 3A)

As shown in FIGS. 20 and 22, in the transformer 3A of the present modification, direction of the magnetic flux, which is formed in the four leg portions UC1 to UC4 and DC1 to DC4, is directed in a same direction in the first leg portion pair constituted from the first leg portions UC1 and DC1 and the third leg portions UC3 and DC3 while directed in a same direction in the second leg portion pair constituted from the second leg portions UC2 and DC2 and the fourth leg portions UC4 and DC4. In addition, directions of the magnetic fluxes are opposite to each other between the first leg portion pair and the second leg portion pair. In other words, magnetic fluxes generated in the first leg portions UC1 and DC1 and the third leg portions UC3 and DC3 may both be directed in a first direction, and magnetic fluxes generated in the second leg portions UC2 and DC2 and the fourth leg portions UC4 and DC4 may both be directed in the second direction opposite to the above-mentioned first direction.

Figure 23A:
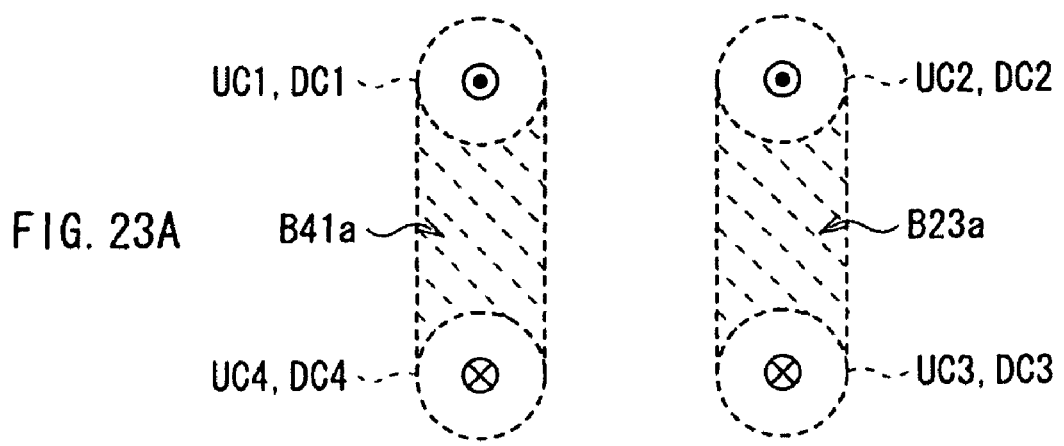
FIGS. 23A and 23B are planar schematic diagrams to explain the operation of the transformer illustrated in FIG. 19.
Figure 23B:
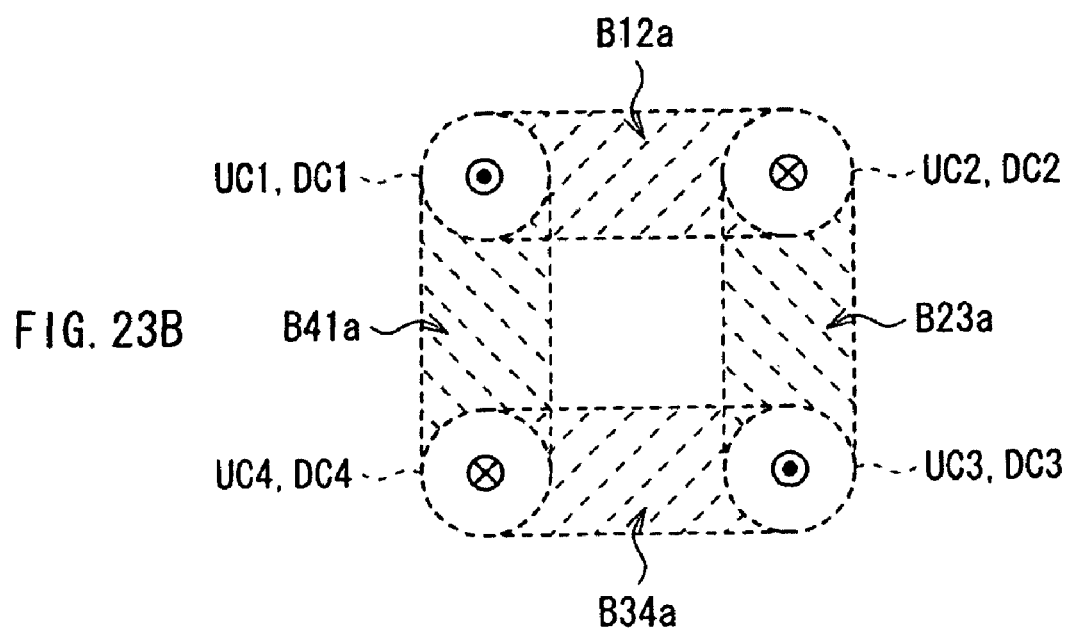

When the primary windings 31A and 31B, the secondary windings 32A to 32D and the third windings 33A and 33B are wound around to make the magnetic flux directed in such directions, as shown in FIGS. 22 and 23B for example, four annular magnetic paths, which are constituted from the annular magnetic paths B12a and B12b passing through the inside of the first leg portions UC1 and DC1 and the second leg portions UC2 and DC2, the annular magnetic paths B23a and B23b passing through the inside of the second leg portions UC2 and DC2 and the third leg portions UC3 and DC3, the annular magnetic paths B34a and B34b passing through the inside of the third leg portions UC3 and DC3 and the fourth leg portions UC4 and DC4, and the annular magnetic paths B41a and B41b passing through the inside of the fourth leg portions UC4 and DC4 and the first leg portions UC1 and DC1, are formed. The formation area of these four annular magnetic paths B12a, B12b, B23a, B23b, B34a, B34b, B41a and B41b goes around the four leg portions UC1 to UC4 and DC1 to DC4 on the base cores UCb and DCb. Namely, the annular magnetic paths B12a and B12b and the annular magnetic paths B41a and B41b are shared by the first leg portions UC1 and DC1, the annular magnetic paths B12a B12b and the annular magnetic paths B23a and B23b are shared by the second leg portions UC2 and DC2, the annular magnetic paths B23a and B23b and the annular magnetic paths B34a and B34b are shared by the third leg portions UC3 and DC3, and the annular magnetic path B34a and B34b and the annular magnetic paths B41a and B41b are shared by the fourth leg portions UC4 and DC4. In other words, four flux paths, each flowing in one direction through adjacent two of the four leg portions UC1 to UC4 and DC1 to DC4 and through the two base cores UCb and DCb, are formed in the four leg portions UC1 to UC4 and DC1 to DC4 and the two base cores UCb and DCb.

Accordingly, compared with a case where only two annular magnetic paths are formed as shown in FIG. 23A for example, such as annular magnetic paths B41a and B41b passing through the inside of the first leg portions UC1 and DC1 and the fourth leg portions UC4 and DC4 and the annular magnetic paths B23a and B23b passing through the inside of the second leg portions UC2 and DC2 and the third leg portions UC3 and DC3, (that corresponds to a case where two U-shaped cores of related art are used), the magnetic flux in the magnetic core 30A is dispersed, and thus flux density may be reduced to decrease occurrence of core loss. In addition, since radiation path is expanded compared with a case where E-shaped core is used as before, cooling of the magnetic core 30A, the primary windings 31A and 31B, the secondary windings 32A to 32D and the third windings 33A and 33B gets more easy.

As mentioned above, according to the present embodiment, since the primary windings 31A and 31B, the secondary windings 32A to 32D and the third windings 33A and 33B are wound around so that the magnetic fluxes formed in the penetrating direction in the four leg portions UC1 to DC4 and DC1 to DC4 may be directed in a same direction in the first leg portion pair constituted from the first leg portions UC1, DC1 and the third leg portions UC3, DC3 while directed in a same direction in the second leg portion pair constituted from the second leg portions UC2, DC2 and the fourth leg portions UC4, DC4 and that the magnetic fluxes of the first and second leg portion pairs are directed opposite to each other, the four annular magnetic paths B12a, B12b, B23a, B23b, B34a, B34b, B41a and B41 are formed as described above, and the formation area of the four annular magnetic paths goes around the four leg portions UC1 to UC4 and DC1 to DC4 on the base core UCb and DCb. In other words, according to the present embodiment, the primary windings 31A and 31B, the secondary windings 32A to 32D and the third windings 33A and 33B are wound around so that both of the magnetic fluxes generated inside the first leg portions UC1 DC1 and the third leg portions UC3 and DC3 may be directed in the first direction, while both of the magnetic fluxes generated inside the second leg portions UC2 and DC2 and the fourth leg portions UC4 and DC4 may be directed in the second direction opposite to the first direction. Thus four flux paths, each flowing in one direction through adjacent two of the four leg portions UC1 to UC4 and DC1 to DC4 and through the two base cores UCb and DCb, are formed inside the four leg portions UC1 to UC4 and DC1 to DC4 and the two base cores UCb and DCb. In this manner, the flux density in the magnetic core 30A is reduced to decrease occurrence of core loss compared with the case where the U-shaped core is employed. Thus, the core height may be lowered by reducing the core thickness (thickness of the base portion). In addition, since radiation path is expanded compared with the case when an E-shaped core is employed, cooling of the magnetic core 30A, the primary windings 31A and 31B, the secondary windings 32A to 32D and the third windings 33A and 33B gets more easy. As a result, cost reduction is available while increasing reliability of product.

In addition, in such configuration, the switching power supply unit as a whole unit gets able to deal with a big current without parallel operation of a plurality of bridge circuits 1, transformers 3A and so on. In this manner, reduction of the number of components is available and that may also result in the cost reduction.

What is more, the primary windings 31A and 31B, the secondary windings 32A to 32D and the third windings 33A and 33B are configured to be pulled out from outside via wirings (the connection lines L21 and L22, the connection lines L31 and L32, the output line LO or the ground line LG) along the in-plane direction of the printed coils 310 and 330 and the four metal plates. Accordingly, the height of the core including wiring gets able to be lowered compared with a case where such wiring is pulled out in a direction vertical to the plane of the printed coils 310 and 330 and the four metal plates while the pullout structure of the wiring becomes more simple.

Figure 24A:
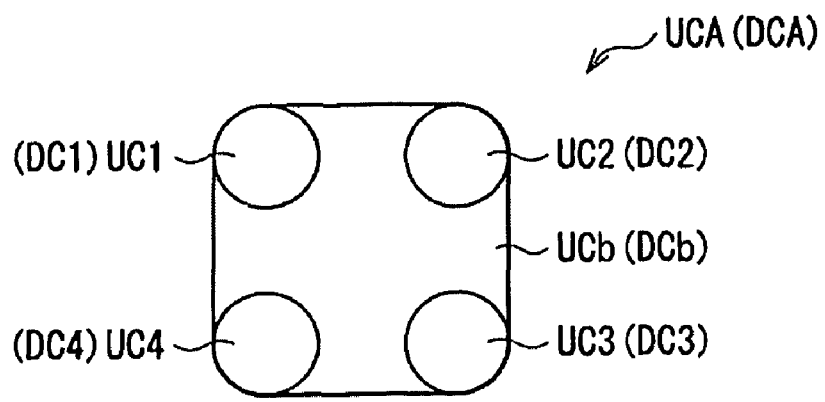
FIGS. 24A to 24C are plan views to show an external appearance configuration of other examples of an upper core and a lower core of the transformer of FIG. 19.
Figure 24B:
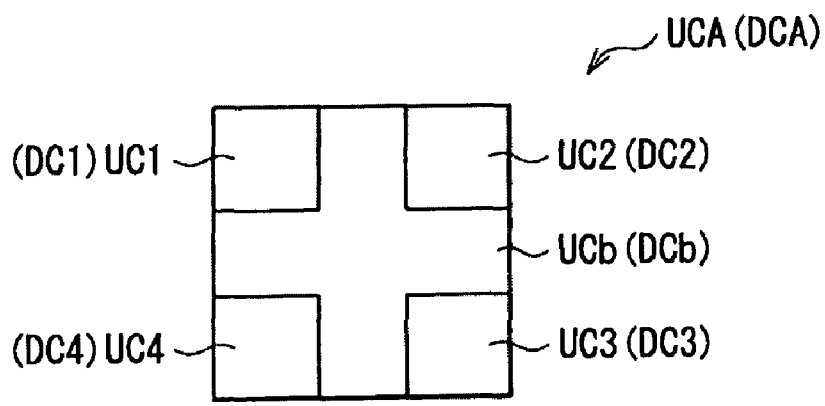
Figure 24C:
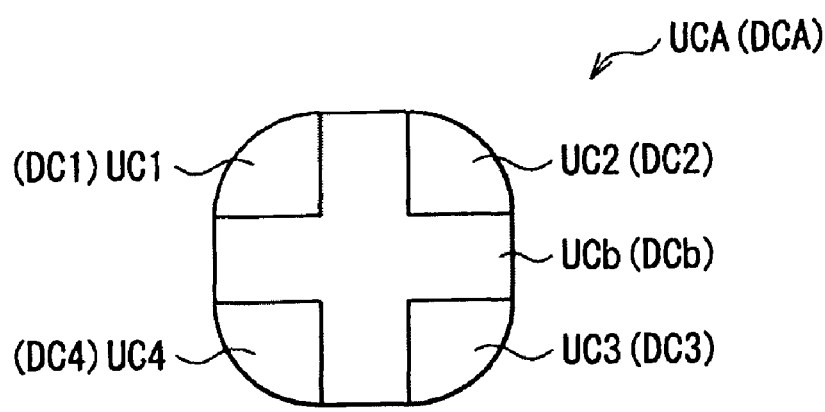

According to the present embodiment, description is made as to the case in which each side-face of the four leg portions UC1 (DC1) to UC4 (DC4) is a curved surface as shown in FIG. 24A of the upper core UC (lower core DC), but the side-face geometry of each leg portion is not limited thereto. Specifically, as shown in FIGS. 24B and 24C for example, the four leg portions UC1 (DC1) to UC4 (DC4) may be configured such that at least mutually-opposed side-faces are parallelized each other. In such configuration, concentration of magnetic flux on the shortest magnetic flux path in the magnetic core 30A is more effectively modified to improve the reduction of core loss. Further in this case, the outer surface of the four leg portions UC1 (DC1) to UC4 (DC4), on a side opposite to the mutually-opposed side-faces, may be a curved surface as shown in FIG. 24C for example. In such configuration, the primary windings 31A and 31B, the secondary windings 32A to 32D and the third windings 33A and 33B are wound around the respective leg portions more easily so that the current path is shortened and concentration of current distribution to angular portions is modified. By the way, the angular portions on the side-faces of the four leg portions UC1 (DC1) to UC4 (DC4) of FIGS. 24B and 24C may be chamfered to form a curved plane or a flat plane.

In the above-mentioned modification, description is made as to the case in which the four leg portions UC1 (DC1) to UC4 (DC4) are disposed at the four corners of the rectangular (square) base cores UCb and DCb, but it is not always limited thereto. Namely, it may be sufficient if the four leg portions are disposed separately in pairs on the two straight lines that are diagonally intersecting each other on the base core. What is more, the shape and size of the base cores is not limited to square as shown in the above-mentioned embodiments and so on, and any other shape and size may be available as long as it functions as a substrate of the four leg portions.

[Modifications 2 and 3]

Figure 25:
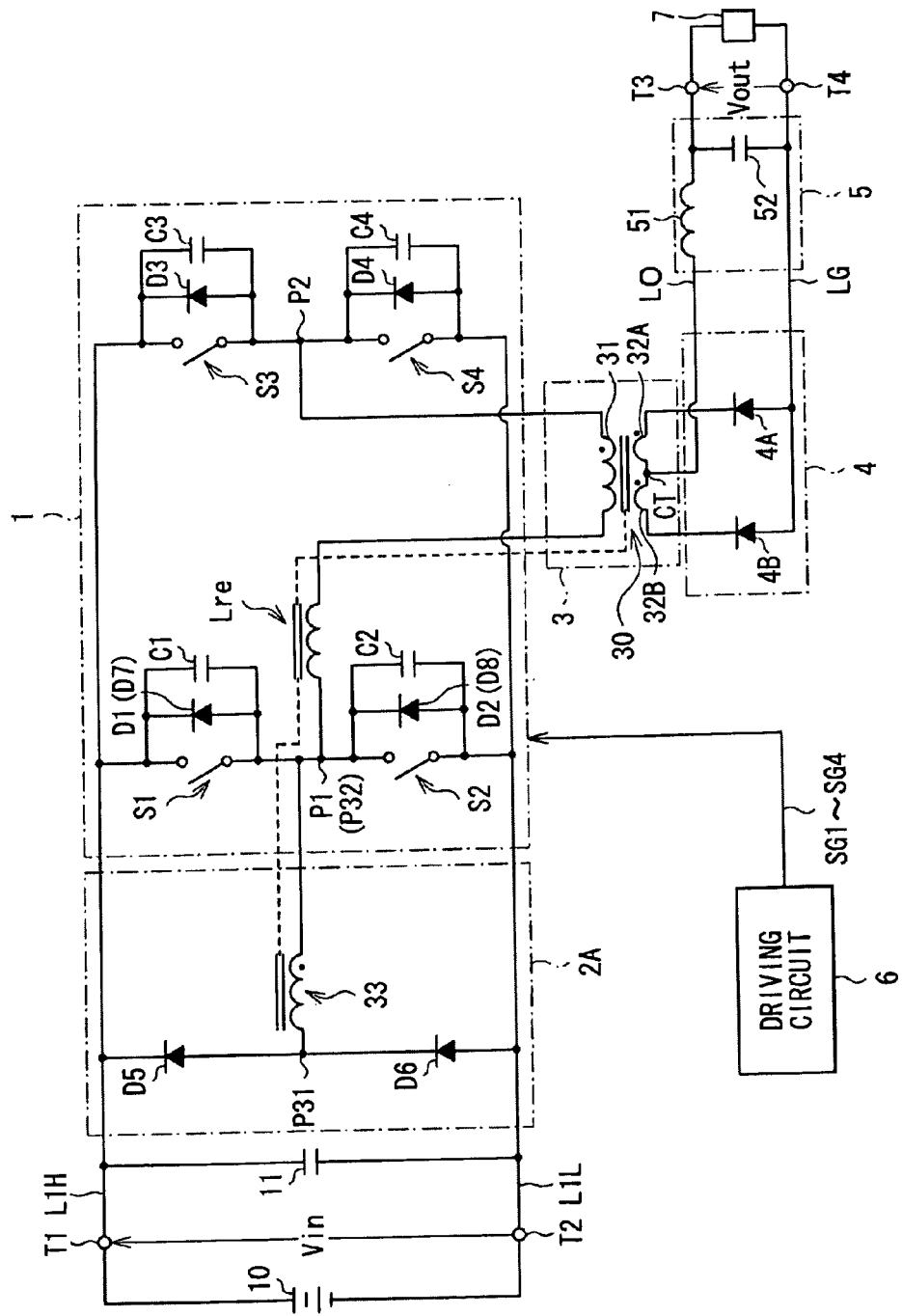
FIG. 25 is a circuit diagram showing a configuration of a switching power supply unit according to Modification 2 of the present invention.
Figure 26:
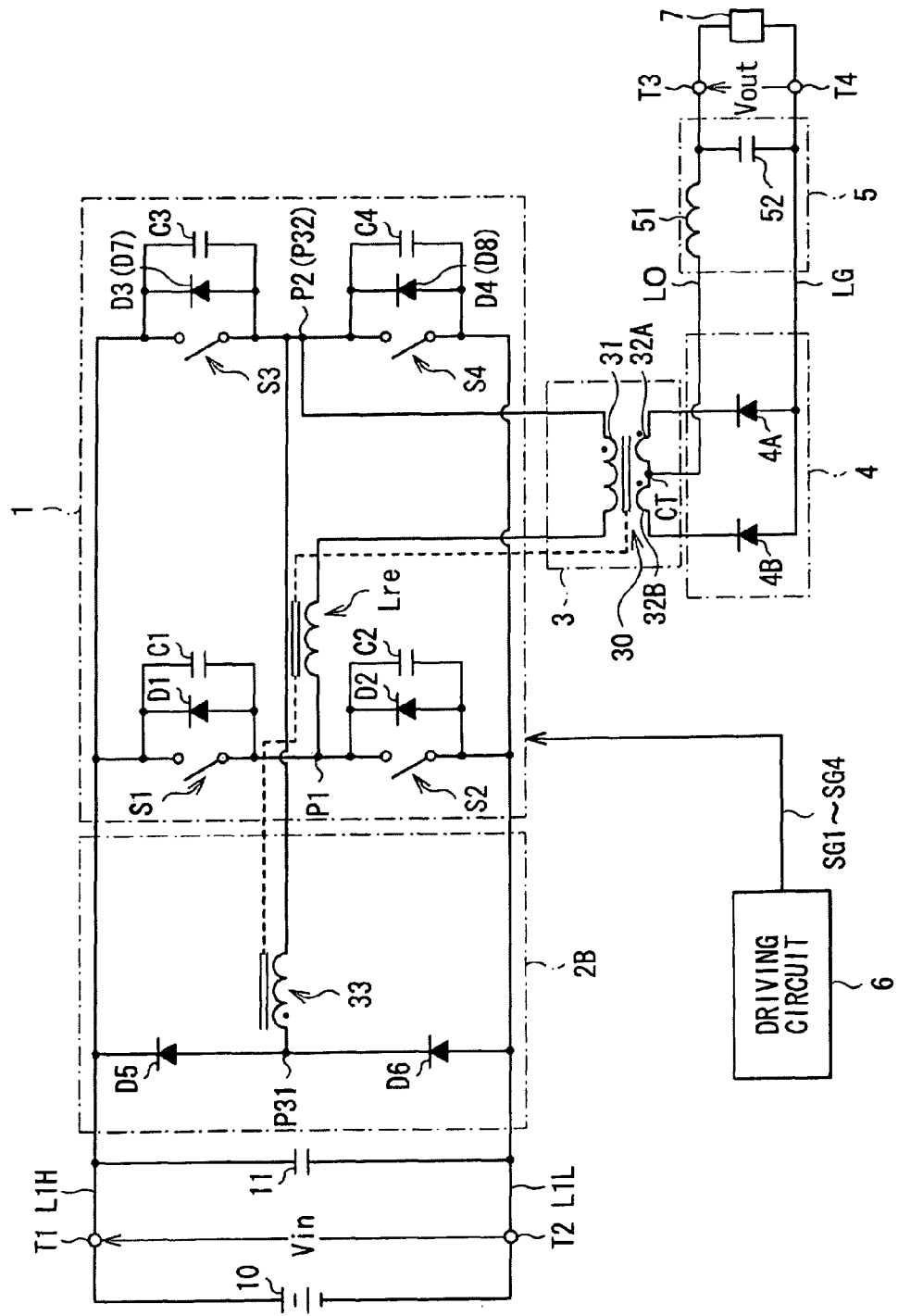
FIG. 26 is a circuit diagram showing a configuration of a switching power supply unit according to Modification 3 of the present invention.

FIG. 25 is a circuit diagram of a switching power supply unit according to Modification 2 of the present invention. FIG. 26 is a circuit diagram of a switching power supply unit according to Modification 3 of the present invention. The switching power supply unit of these modifications is constituted such that a surge voltage suppressing circuits 2A or 2B is provided in substitution for the surge voltage suppressing circuit 2 of the above-mentioned embodiment.

The surge voltage suppressing circuit 2A has two diodes D5 and D6 and a third winding 33. Specifically, the cathode of the diode D5 is connected to a primary side high voltage line L1H, and the anode thereof is connected to a connection point P31. The cathode of the diode D6 is connected to the connection point P31 and the anode thereof is connected to a primary side low voltage line L1L. One end of the third winding 33 is connected to the connection point P31, and the other end is connected to a connection point P1 (corresponding to the connection point P32 of the above-mentioned embodiment). In this configuration, the surge voltage suppressing circuit 2A is configured such that diodes D1 and D2 in the bridge circuit 1 also serve as the diodes D7 and D8 of the foregoing surge voltage suppressing circuit 2.

Meanwhile, a surge voltage suppressing circuit 2B is configured to have two diodes D5 and D6 and a third winding 33 as with the surge voltage suppressing circuit 2A. Specifically, the cathode of the diode D5 is connected to a primary side high voltage line L1H and the anode thereof is connected to a connection point P31. The cathode of the diode D6 is connected to a connection point P31 and the anode thereof is connected to a primary side low voltage line L1L. One end of the third winding 33 is connected to the connection point P31, and the other end is connected to a connection point P2 (corresponding to the connection point P32 of the above-mentioned embodiment). In this configuration, the surge voltage suppressing circuit 2B is configured such that diodes D3 and D4 in the bridge circuit 1 may also serve as the diodes D7 and D8 of the foregoing surge voltage suppressing circuit 2.

Namely, in these surge voltage suppressing circuits 2A and 2B, the diodes (diodes D1 and D2 or diodes D3 and D4) that are connected in parallel with two switching elements (switching elements S1 and S2, or switching elements S3 and S4) that constitute one of the two arms in the bridge circuit 1 may also serve as the two diodes (diode D5 and D6, or diodes D7 and D8) that constitute one of the two arms in the full bridge circuit in the surge voltage suppressing circuit. The two surge voltage suppressing circuits 2A and 2B are different in the connection point to which the other end of the third winding 33 is connected (whether connected to the connection point P1 or the connection point P2) and the winding direction of the third winding 33.

In these configurations, effects similar to the above-mentioned embodiment are also available in modifications 2 and 3 because of the surge voltage suppressing function obtainable in their surge voltage suppressing circuits 2A and 2B, which is similar to that of the surge voltage suppressing circuit 2.

In addition, since the diodes D1 and D2 or the diodes D3 and D4 in the bridge circuit 1 are disposed to also serve as the diodes D7 and D8 of the foregoing surge voltage suppressing circuit 2, the number of the diodes (two) in the surge voltage suppressing circuits 2A and 2B are reduced compared with that (four) in the surge voltage suppressing circuit 2, that is, the number of components may be more reduced compared with the above-mentioned embodiment.

(Other Modifications)

Although the present invention has been described with reference to the above-mentioned embodiment and modifications, the invention is not limited to the embodiment and modifications but may be variously modified.

For example, in the above-mentioned embodiment and so on, although the shape of the primary winding, the secondary winding and the third winding is explained in detail, the shape thereof is not limited thereto and other shapes may be applicable. Further, the primary winding, the secondary winding and the third winding may be constituted from either a printed coils or a metal plate.

In the above-mentioned embodiment and so on, description is made as to the case in which the rectifier circuits 4 and 41 are of a center tap type having a configuration of anode common connection, but it is not limited thereto. Specifically, for example, it may have a configuration of the cathode common connection of a center tap type instead of the anode common connection, or may be a type other than the center tap type (full bridge type, half bridge type, current doubler type, forward type, flyback type, etc., for example). A rectifier circuit of a half-wave-rectification type may also be applicable instead of the full-wave-rectification type. When the full bridge rectifier circuit is employed, the maximum value (peak value) of the surge voltage applied to four rectifier diodes may be suppressed to $1*Vin/n$ (where n is the turns ratio of the primary winding against the secondary winding of a transformer).

What is more, modifications and so on as described above may be combined variously.

The present application contains subject matter related to that disclosed in Japanese Priority Patent Application JP2009-085955 filed in the Japan Patent Office on Mar. 31, 2009, the entire content of which is hereby incorporated by reference. It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply unit which generates a DC output voltage through performing voltage conversion on a DC input voltage inputted from an input terminal pair and outputs the generated DC output voltage from an output terminal pairs, comprising:
   a switching circuit of full bridge type disposed on a side near the input terminal pair and including four switching elements which configure two arms of the full bridge switching circuit;
   a rectifier circuit disposed on a side near the output terminal pair and including a plurality of first rectifier devices;
   a transformer disposed between the switching circuit and the rectifier circuit and including a first winding on a side near the input terminal pair, a second winding on a side near the output terminal pair, and a third winding;
   a surge voltage suppressing circuit connected in parallel with the switching circuit and including a full bridge circuit configured of four second rectifier devices which configure two arms of the surge voltage suppressing circuit, each of the four second rectifier devices being disposed so as to be applied with a voltage of reverse direction; and
   a driving circuit driving the switching circuit, wherein
   the third winding is connected to the full bridge circuit to form a H-bridge configuration; and
   magnetic coupling between the first and second windings and magnetic coupling between the first and third windings are both looser than magnetic coupling between the second and third windings.

2. The switching power supply unit according to claim 1, further comprising:
   third rectifier devices connected in parallel with the four switching elements, respectively, wherein
   two of the third rectifier devices, connected in parallel with two of the four switching elements, respectively, also serve as two of the four second rectifier devices,
   the two of the four switching elements forming one of the two arms in the switching circuit, and the two of the four second rectifier devices forming one of the two arms in the full bridge circuit.

3. The switching power supply unit according to claim 2, wherein
   each of the switching element is configured of a field effect transistor, and
   each of the third rectifier device is configured of a parasitic diode of the field effect transistor.

4. The switching power supply unit according to claim 1, further comprising capacitive elements connected in parallel with the four switching elements, respectively, wherein
   the third winding and the capacitive elements together serve as an LC resonance circuit.

5. The switching power supply unit according to claim 4, wherein
   each of the switching element is configured of a field effect transistor, and
   each of the capacitive element is configured of parasitic capacitor of the field effect transistor.

6. The switching power supply unit according to claim 1, wherein
   the transformer includes:
   a magnetic core including two base-plates facing each other and four legs provided between the two base-plates to couple the two base-plates together, the four legs being arranged along a pair of diagonal lines intersecting each other in a plane along facing surfaces of the two base-plates;
   a first conductive member having through-holes through which the four legs pass, respectively, and being wound around part of the four legs, to serve as the first winding;
   second conductive members each having a through-hole through which one of the four legs passes, and being wound around the one of the four legs, to serve as the second winding; and
   a third conductive member having through-holes through which the four legs pass, respectively, and being wound around part of the four legs, to serve as the third winding;
   wherein,
   the first to third windings are wound around so that closed magnetic paths are formed inside the magnetic core from the four legs to the two base-plates due to currents which flow through the first, second or third winding, and so that a couple of magnetic fluxes each generated inside each of a couple of legs arranged along one of the two diagonal lines are both directed in a first direction, while so that another couple of magnetic fluxes each generated inside each of another couple of legs arranged along another diagonal line are both directed in a second direction which is opposite to the first direction.

7. The switching power supply unit according to claim 1, wherein
   the transformer includes:
   a magnetic core including two base-plates facing each other and four legs provided between the two base-plates to couple the two base-plates together, the four legs being arranged along a pair of diagonal lines intersecting each other in a plane along facing surfaces of the two base-plates;
   a first conductive member having through-holes through which the four legs pass, respectively, and being wound around part of the four legs, to serve as the first winding;
   second conductive members each having a through-hole through which one of the four legs passes, and being wound around the one of the four legs, to serve as the second winding; and
   a third conductive member having through-holes through which the four legs pass, respectively, and being wound around part of the four legs, to serve as the third winding;
   wherein,
   the first to third windings are wound around so that four closed magnetic paths are formed inside the magnetic core from the four legs to the two base-plates due to currents which flow through the first, second or third winding, the four closed magnetic paths each passing through both adjacent two of the four legs and the two base-plates and then returning.

* * * * *